(12) United States Patent
Mochizuki et al.

(10) Patent No.: US 6,380,941 B2
(45) Date of Patent: Apr. 30, 2002

(54) MOTION DATA GENERATION APPARATUS, MOTION DATA GENERATION METHOD, AND MOTION DATA GENERATION PROGRAM STORAGE MEDIUM

(75) Inventors: Yoshiyuki Mochizuki; Toshiya Naka, both of Oosakashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/777,135

(22) Filed: Feb. 5, 2001

Related U.S. Application Data

(63) Continuation of application No. 09/126,570, filed on Jul. 30, 1998.

(30) Foreign Application Priority Data

Aug. 1, 1997 (JP) ............................................. 9-207531

(51) Int. Cl.[7] .............................................. G06F 15/00
(52) U.S. Cl. ....................................................... 345/474
(58) Field of Search ................................ 345/474, 475, 345/473, 419, 427, 428

(56) References Cited

U.S. PATENT DOCUMENTS

| 6,222,560 | B1 | * | 4/2001 | Naka et al. | ................. | 345/473 |
| 6,249,292 | B1 | * | 6/2001 | Christen et al. | ............ | 345/474 |
| 6,285,380 | B1 | * | 9/2001 | Perlin et al. | ................ | 345/473 |

FOREIGN PATENT DOCUMENTS

| EP | 0 712 097 | 5/1996 |
| EP | 0 836 156 | 4/1998 |
| JP | 10-172005 | 6/1998 |

OTHER PUBLICATIONS

"Fourier Principles for Emotion–Based Human Figure Animation", Computer Graphics Proceedings, Annual Conference Series, pp. 91–96,1995.

Perlin, K., "Real Time Responsive Animation With Personality", IEEE Transactions on Visualization and Computer Graphics, vol. 1, No. 1, Mar. 1, 1995, pp. 5–15.

Rose, C., et al., "Efficient Generation of Motion Transitions Using Spacetime Constraints", Computer Graphics Proceedings 1996 (Siggraph), New Orleans, Aug. 4–9, 1996, Aug. 4, 1996, pp. 147–154.

* cited by examiner

*Primary Examiner*—Phu K. Nguyen
(74) *Attorney, Agent, or Firm*—Burr & Brown

(57) ABSTRACT

An apparatus generating a closed-loop periodic motion data from open time-series motion data given for moving a multi-joint rigid body object, and comprising an open periodic motion generating unit for making local movements of a multi-joint rigid body object periodic and generating an open periodic time-series motion data, a closed-loop motion generating unit for reading out the position data of the whole object among the open periodic time-series motion data, generating the position data of the whole object made its motion closednb n-loop, replacing the position data of the whole object among open periodic time-series motion data stored in a storage unit with the generated data, and storing the generated data in the storage unit.

24 Claims, 30 Drawing Sheets

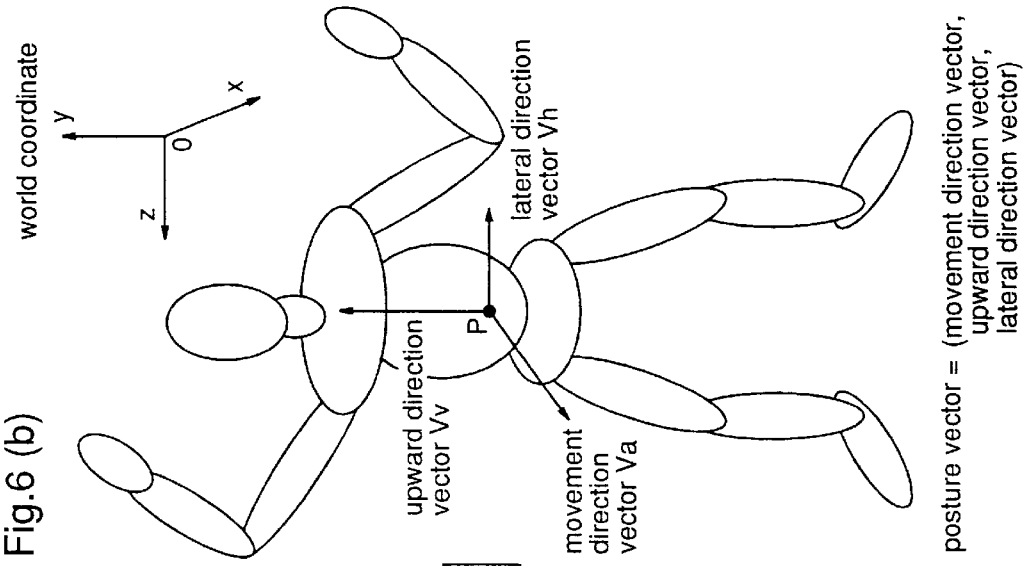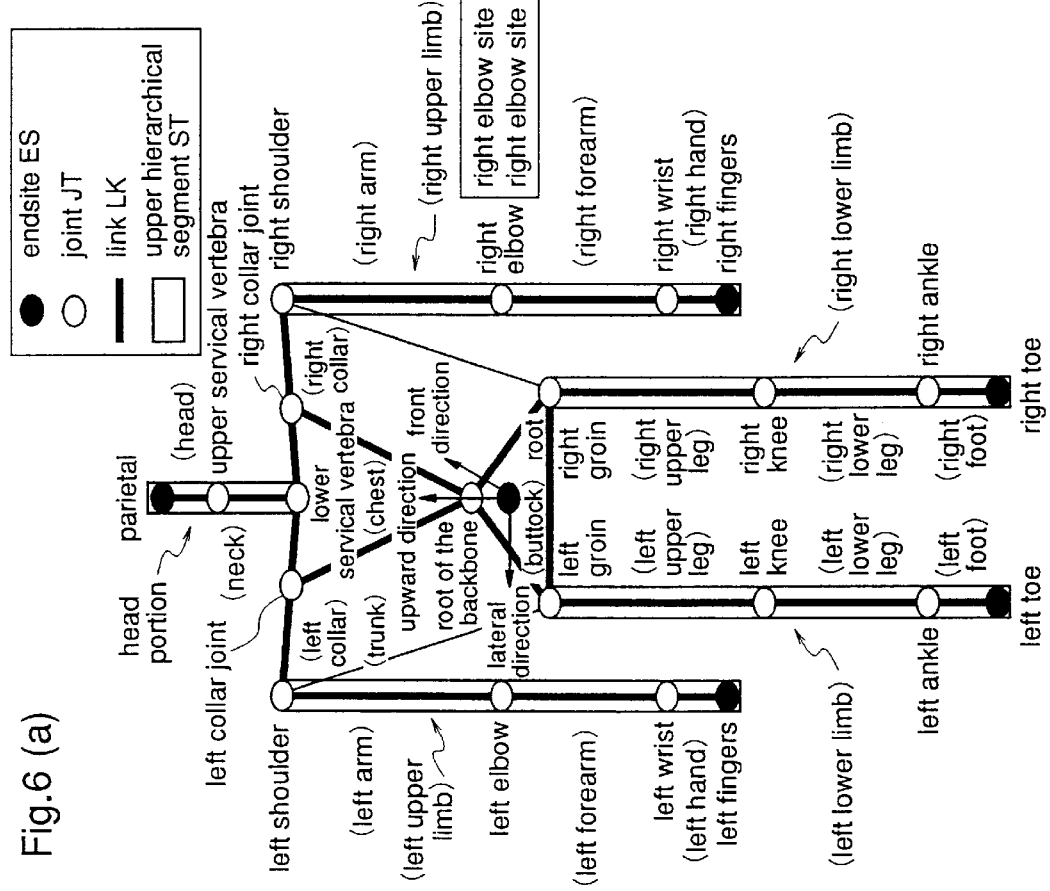

open non-periodic motion open periodic motion closed-loop periodic motion

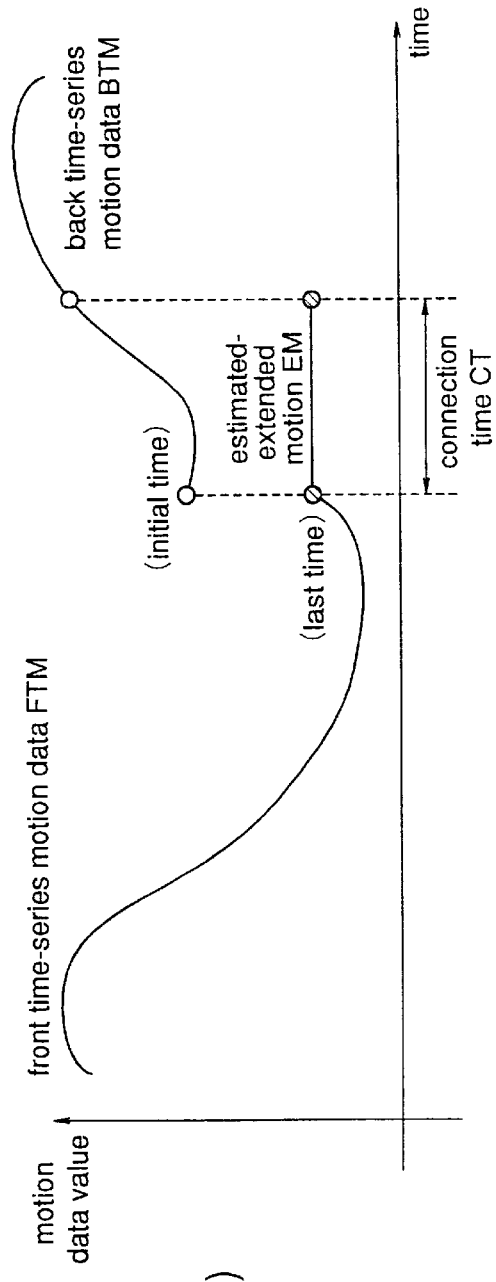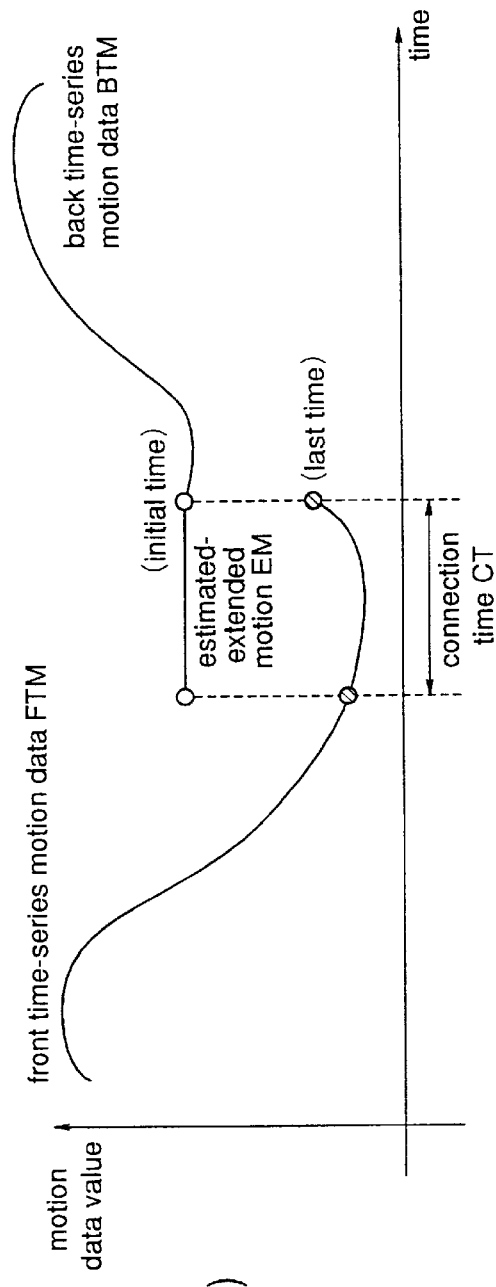

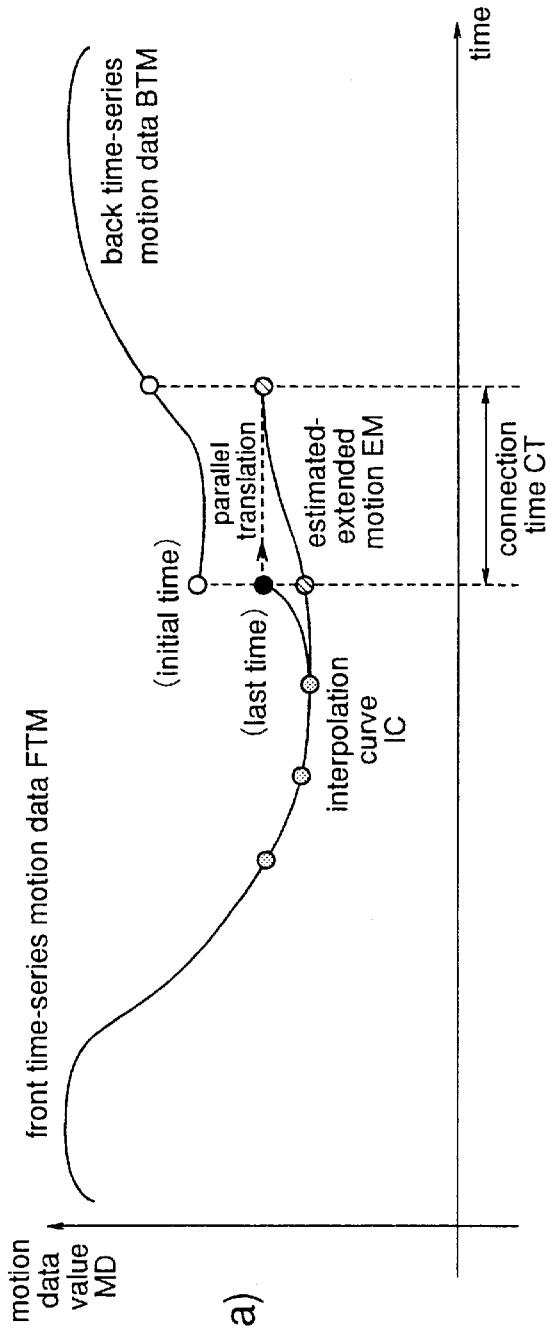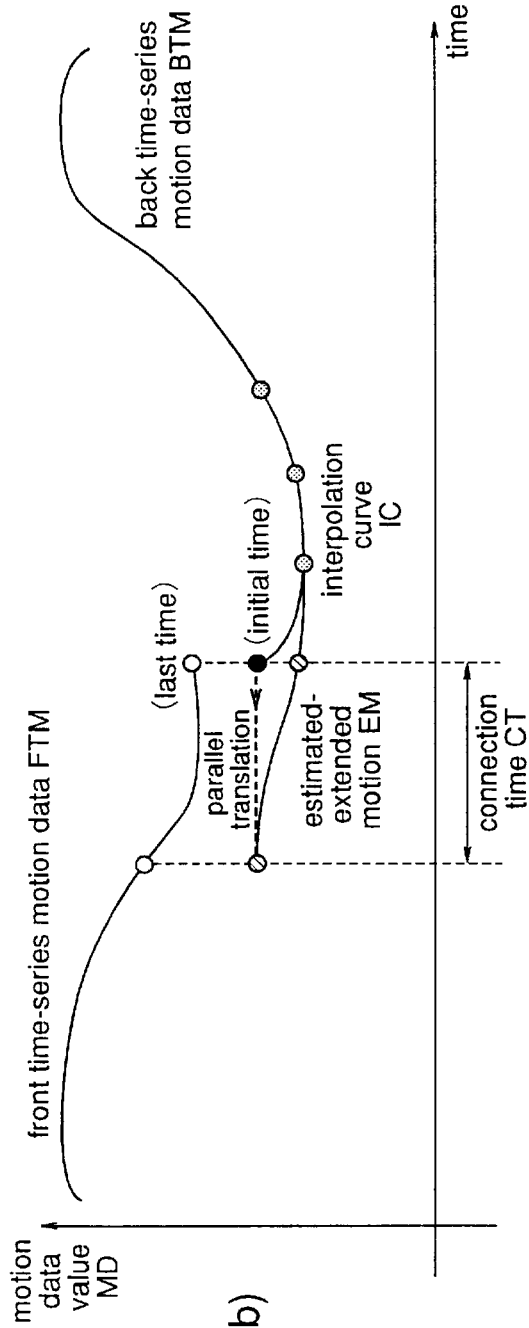
Fig.22 (a)
Fig.22 (b)

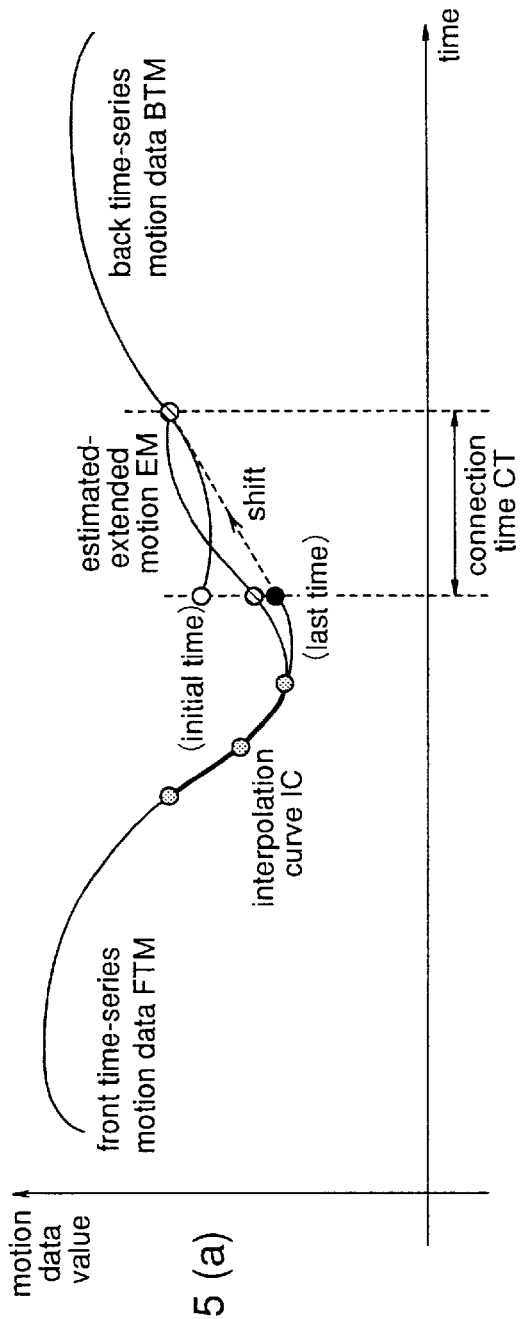
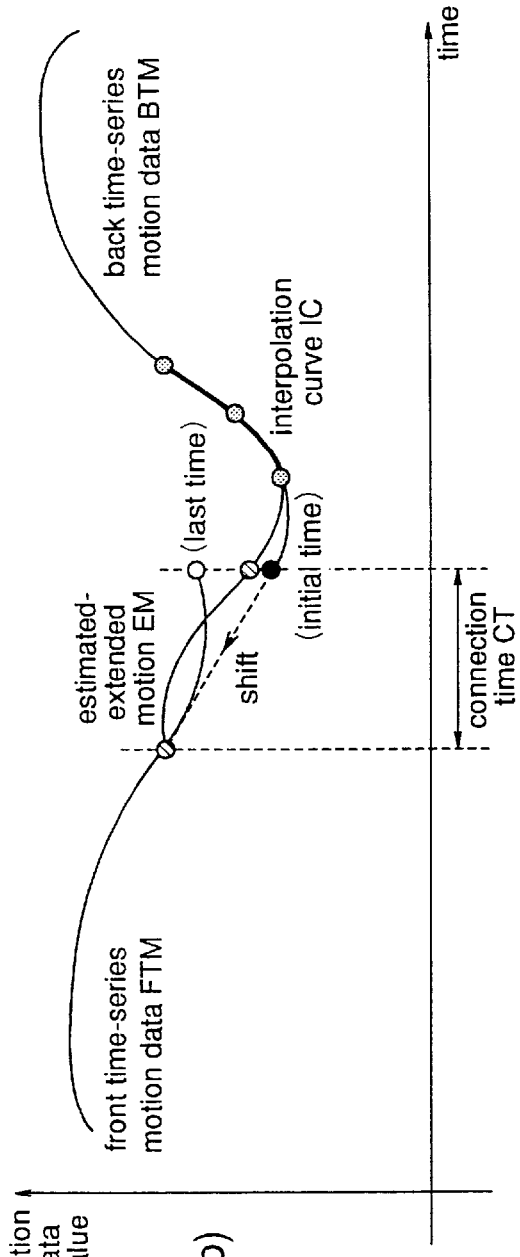
Fig.25 (a)
Fig.25 (b)

MOTION DATA GENERATION APPARATUS, MOTION DATA GENERATION METHOD, AND MOTION DATA GENERATION PROGRAM STORAGE MEDIUM

CROSS REFERENCE TO RELATED APPLICATION

This is a continuation application of U.S. Ser. No. 09/126,570, filed Jul. 30, 1998, the entirety of which is incorporated herein by reference.

FIELD OF THE INVENTION

The present invention relates to a motion data generation apparatus, a motion data generation method, and a motion data generation program storage medium, which are used in a field of computer graphics animation, and, more particularly, to an apparatus and a method for automatically generating closed-loop periodic motion data from time-series motion data resulting from connecting single or plural open time-series motion data given for moving a multi-joint rigid body object.

BACKGROUND OF THE INVENTION

Definitions will be described before discussing a main subject. In the computer graphics animation, as shown in FIG. 6(a), a skeletal structure equivalent to the bones of a multi-joint rigid body object is defined to move a human and a creature modeled by the multi-joint rigid body object realistically, and the motion of a human is decided by the motion of the skeletal structure.

In FIG. 6(a), ES denotes an end site corresponding to that of a human; JT, a joint corresponding to that of a human; LK, a link corresponding to a bone of a human; ST, a segment corresponding to a higher hierarchical part constituting a human, such as a neck, arm, or leg.

Motion data of the skeletal structure is time-series data. A concept of motion data of an object, such as a human and a creature modeled by a multi-joint rigid body object, in the computer graphics animation will be described with reference to FIG. 6(b). In the figure, a model of multi-joint rigid body object is a human. As described above, the motion data is generally time-series data. The motion data comprises three posture angles Aa, Av, and Ah used for controlling the posture of the whole object, a slide vector indicating the amount of parallel translation used for controlling the movement of each joint, and a joint angle Aj indicating the amount of rotation.

To indicate the position of a whole object O, a point P is predetermined and fixed inside each object. To indicate the posture of the whole object O, a movement direction vector Va, an upward direction vector Vv, and a lateral direction vector Vh are defined, and called posture vectors.

With a coordinate system introduced by the fixed point P and the posture vectors Va, Vv, and Vh, the position of each joint of the object can be inherently determined. As opposed to this, in the computer graphics, each object has its own coordinate system, called an object coordinate system, for defining its shape. Hence, the origin of the object coordinate system is the point P indicating the position of the whole object O. Unit vectors defining the object coordinate system are the posture vectors.

The posture angles Aa, Av, and Ah are the amounts of rotation about the three axes of a world coordinate system (x, y, z). To calculate the posture vectors Va, Vv, and Vh at a certain time, the posture vectors in the initial state are rotationally converted about X, Y, and Z axes by the respective amounts of rotation. The posture of the whole object is thus controlled at each time. The movement of a joint is controlled by parallel translation by a slide vector, and rotation about each axis, in a local coordinate system defined for each joint. Although the foregoing discussion is based on a multi-joint rigid body object, this invention is not restricted to a rigid body or a multi-joint object. Other kinds of body or a single joint, or the combination of those can be employed in this invention.

The motion data comprises three posture angles used for controlling the posture of the whole object, a slide vector indicating the amount of parallel translation used for controlling the movement of each joint, and a joint angle indicating the amount of rotation.

To indicate the position of a whole object, a point is predetermined and fixed inside each object. To indicate the posture of the whole object, a movement direction vector, an upward direction vector, and a lateral direction vector are defined, and called posture vectors. This situation is shown in FIG. 6(b). With a coordinate system introduced by the fixed point and the posture vectors, the position of each joint of the object can be inherently determined.

As opposed to this, in the computer graphics, each object has its own coordinate system, called an object coordinate system, for defining its shape. Hence, the origin of the object coordinate system is the point indicating the position of the whole object. Unit vectors defining the object coordinate system are the posture vectors. The posture angles are the amounts of rotation about the three axes of a world coordinate system. To calculate the posture vectors at a certain time, the posture vectors in the initial state are rotationally converted about the three axes by the respective amounts of rotation. The posture of the whole object is thus controlled at each time. The movement of a joint is controlled by parallel translation by a slide vector, and rotation about each axis, in a local coordinate system defined for each joint.

As shown in FIG. 7(b), the time-series motion data of the position of an object at an initial time does not match that at a last time. The local movements of the object are different at all between at the initial time and at the last time. This motion is called an open non-periodic motion. That is, when the same open non-periodic motion is continually repeated, the state at the last time transfers abruptly to the state at the initial time, while the object suddenly jumps from the position at the last time to that at the initial time. Therefore, the motion cannot be repeated.

An open periodic motion is a motion, as shown in FIG. 7(b), in which the position of the object at the initial time does not match that at the last time, but the states of an object at the last time and at the initial time are almost the same, so the object transfers from the state at the last time to that at the initial time, naturally and smoothly. When the same open periodic motion is continually repeated, the transition of the state of the object is always natural and smooth, but as to the position of the object, the object suddenly jumps from the position at the last time to that at the initial time. Therefore, the motion cannot be repeated, either.

As opposed to those, a closed-loop periodic motion is a motion, as shown in FIG. 7(c), in which as to both the state and the position of an object, there is no abrupt transition, or no sudden jump to anywhere not expected. Therefore, the motion can be repeated.

Time-series motion data as a result of connection of plural time-series motion data becomes an open non-periodic motion unless the data is subjected to a special processing described below in this invention.

By the way, recently, in the field of computer graphics animation, always required is realistic motions of a creature, such as a human, modeled by a multi-joint rigid body object.

Three-dimensional time-series data representing such motions are generated by an animator using a method including key-framing interpolation, or a motion capture technique which is a 3-D motion measuring technique capturing real movements.

It takes a long time to process motions generated by such methods, and the motions are generated basically as open time-series data which is a unit having a minimum meaning as a movement, taking into account that the generated movement is reused. Hence, those small pieces of motion must be connected to get a series of motion over a long time. However, the motion data resulting from connection of open time-series motion data becomes inevitably open time-series motion data.

There are several conventional methods of connecting motion data. The most primitive one of those methods is a method such that an expert called the foregoing animator estimates a motion connecting between motions, and producing the motion data of the connecting motion by handiwork. However, the method has poor productivity, and because the work of estimating a motion in three-dimensional space depends on the experience of an animator, the connecting motion produced is often unnatural. When a closed-loop motion is produced, unnaturalness also exists.

In this situation, there has been proposed a first prior art method aiming to automate the connection of motions in a case where the local movement of an object or body is periodic, that is, Munetoshi Unuma, et al., Fourier Principles for Emotion-based Human Figure Animation", SIGGRAPH95 Proceeding, pp 91–96, 1995.

In this prior art method, the time-series data of front and back motions to be connected to each other are Fourier-expanded, the motion in the connecting interval is extrapolated in the frequency space, and the result is inversely Fourier-expanded to produce a motion in the connecting interval. In other words, by exploiting the periodicity, prediction is performed to produce the data connecting motions. However, it is not possible to produce a closed-loop periodic motion as the motion of a whole object.

A second prior art method is disclosed, Charles Rose, et al., Efficient Generation of Motion Transitions using Spacetime Constraints", SIGGRAPH 96 proceeding, pp 147–154. 1996, which is a motion connecting method in the condition that the periodicity of a local motion of an object or a body is not necessarily required.

In the second prior art method, the motion in the connecting interval is generated by estimating based on the time-series data of front and back motions connecting to each other, exploiting inverse kinematics, inverse dynamics, and optimizing calculation. However, this method simply connects motions, so it is not possible to generate a closed-loop periodic motion.

As described above, the first conventional method is applied only to a motion having originally periodicity. Besides, it is not possible to generate a closed-loop periodic motion as the whole motion of an object or body. It also takes a long time to perform Fourier expansion and inverse Fourier expansion.

Further, the second conventional method, as to motion connection, generates a connecting motion by extrapolating from front and back motions. Since the method includes various kinds of numerical calculation, it takes a long time to get the connecting motion. Connecting motions by predicting from front and back motions is an ill-posed problem. Therefore, only if the estimate function of optimizing calculation matches the conditions of the connection at the time, an appropriate motion is generated. Such a connecting condition depends on each case of front and back motions or a connecting situation separately. Hence, there is no condition satisfied in a general situation, so the motion becomes unnatural.

Incidentally, the second conventional method takes into consideration only torque consumption as an estimate function, and minimizes this. The minimization of the torque consumption is only a necessary condition, but not a sufficient condition. Thus, the method cannot handle all situations. For example, the method does not handle a case where a smooth or high-speed motion is required.

That is, although it takes a long processing time for the second conventional method, the connecting motion often becomes unnatural. The generated motion as a result of the connection becomes an open non-periodic motion, when the starting motions are open.

As described above, in the first and second prior art methods, a connecting motion is generated by estimating based on front and back motions. If the estimation is not true, the connecting motion is inappropriate. What is more, a closed-loop periodic motion cannot be generated.

However, a closed-loop periodic motion plays a very important role in the production of computer graphics animation. For example, when motions of dancing or extras are generated, if all of a series of motions are to be produced, the amount of motion data becomes huge, so the production is very hard. Especially for the realization of real-time animation, this problem is so fatal that the production is actually implausible.

SUMMARY OF THE INVENTION

It is an object of the present invention to provide an apparatus for automatically generating a closed-loop periodic motion data based on time-series motion data generated by connecting single or plural open time-series motion data of moving a multi-joint rigid body object Other objects and advantages of the present invention will become apparent from the detailed description described below; it should be understood, however, that the detailed description and specific embodiment are described by way of illustration only, since various changes and modifications within the scope of the invention will become apparent to those skilled in the art from this detailed description.

According to a first aspect of this invention, there is provided an apparatus of generating motion data, comprising:

a storage unit for storing plural time-series motion data; and a motion connecting unit for reading out plural time-series motion data from said storage unit, connecting the plural time-series motion data to generate a series of time-series motion data, and storing the series of time-series motion data in said storage unit.

Therefore, it is possible to provide an apparatus for generating motion data, able to connect plural time-series motion data and generate new time-series motion data.

According to a second aspect of this invention, there is provided an apparatus of generating motion data, comprising:

a storage unit for storing two time-series motion data to be connected, the two time-series motion data being referred to as front time-series motion data and back time-series motion data, respectively; and a motion connecting unit for estimating motion data in future or past as much as a connection time, in terms of time, for either the front time-series motion data or the back time-series motion data, to generate estimated-extended motion data, and synthesizing connecting motion data based on the estimated-extended motion data and motion data in future or past as much as the connection time, in terms of time, for either the front time-series motion data or the back time-series motion data.

Therefore, it is possible to provide an apparatus for generating motion data, able to connect two time-series motion data and generate new time-series motion data of which the time length is equal to the sum of those of the two time-series motion data.

According to a third aspect of this invention, there is provided the apparatus of the second aspect wherein said motion connecting unit, two time-series motion data being referred to as front time-series motion data and back time-series motion data, respectively, estimates motion data as much as a connection time from the last time of the front time-series motion data to generate estimated-extended motion data, and generates connecting motion data based on the back time-series motion data from the initial time to the connection time after and the estimated-extended motion data.

Therefore, it is possible to provide an apparatus for generating motion data, able to connect two time-series motion data and generate new time-series motion data of which the time length is equal to the sum of those of the two time-series motion data.

According to a fourth aspect of this invention, there is provided the apparatus of the second aspect wherein said motion connecting unit, two time-series motion data being referred to as front time-series motion data and back time-series motion data, respectively, estimates motion data as much as a connection time in the past direction from the initial time of the back time-series motion data, in terms of time, to generate estimated-extended motion data, and generates connecting motion data based on the front time-series motion data from the last time to the connection time before and the estimated-extended motion data.

Therefore, it is possible to provide an apparatus for generating motion data, able to connect two time-series motion data and generate new time-series motion data of which the time length is equal to the sum of those of the two time-series motion data.

According to a fifth aspect of this invention, there is provided the apparatus of the second aspect wherein said motion connecting unit, according to a connection time distribution rate $\gamma$, (a) estimates motion data as much as $\gamma \times$(a connection time) from the last time of the front time-series motion data to generate estimated backward-extended motion data, (b) estimates motion data in the past direction as much as $(1-\gamma) \times$(the connection time) from the initial time of the back time-series motion data, in terms of time, to generate estimated forward-extended motion data, (c) generates a first half of connecting motion data based on the front time-series motion data from the last time to $(1-\gamma) \times$(the connection time) before and the estimated forward-extended motion data, and (d) generates a second half of connecting motion data based on the back time-series motion data from the initial time to $\gamma \times$(the connection time) after and the estimated backward-extended motion data.

Therefore, it is possible to provide an apparatus for generating motion data, able to connect two time-series motion data and generate new time-series motion data of which the time length is equal to the sum of those of the two time-series motion data.

According to a sixth aspect of this invention, there is provided the apparatus of any of the third, fourth, and fifth aspects wherein said open periodic motion generating unit uses a function that (a) is 0 at the initial time of the connection time, and 1 at the last time of the connection time, (b) increases monotonically, (c) is differentiable, and (d) is rotationally symmetrical by 180 degrees about the middle time of the connection time, within the connection time.

Therefore, it is possible to provide an apparatus for generating motion data, able to connect two time-series motion data and generate new time-series motion data of which the time length is equal to the sum of those of the two time-series motion data.

According to a seventh aspect of this invention, there is provided the apparatus of any of the third, fourth, and fifth aspects wherein said open periodic motion generating unit uses a function that (a) is 1 at the initial time of the connection time, and 0 at the last time of the connection time, (b) decreases monotonically, (c) is differentiable, and (d) is rotationally symmetrical by 180 degrees about the middle time of the connection time, within the connection time.

Therefore, it is possible to provide an apparatus for generating motion data, able to connect two time-series motion data and generate new time-series motion data of which the time length is equal to the sum of those of the two time-series motion data.

According to an eighth aspect of this invention, there is provided the apparatus of the third aspect wherein said motion connecting unit estimates that the front time-series motion data at the last time continues as much as a connection time from the last time, and generates estimated-extended motion data.

Therefore, it is possible to provide an apparatus for generating motion data, able to connect two time-series motion data and generate new time-series motion data of which the time length is equal to the sum of those of the two time-series motion data.

According to a ninth aspect of this invention, there is provided the apparatus of the fourth aspect wherein said motion connecting unit estimates that the back time-series motion data at the initial time has continued as much as a connection time in the past direction from the initial time, in terms of time, and generates estimated-extended motion data.

Therefore, it is possible to provide an apparatus for generating motion data, able to connect two time-series motion data and generate new time-series motion data of which the time length is equal to the sum of those of the two time-series motion data.

According to a tenth aspect of this invention, there is provided the apparatus of the third aspect wherein said motion connecting unit estimates that motion data smoothly shifts to the front time-series motion data at the last time a connection time after the last time, and generates estimated-extended motion data.

Therefore, it is possible to provide an apparatus for generating motion data, able to connect two time-series motion data and generate new time-series motion data of which the time length is equal to the sum of those of the two time-series motion data.

According to an eleventh aspect of this invention, there is provided the apparatus of the fourth aspect wherein said motion connecting unit estimates that the motion state of the back time-series motion data a connection time before the initial time of the back time-series motion data smoothly shifts to the back time-series motion data with the motion state of the back time-series motion data at the initial time, and generates estimated-extended motion data.

Therefore, it is possible to provide an apparatus for generating motion data, able to connect two time-series motion data and generate new time-series motion data of which the time length is equal to the sum of those of the two time-series motion data.

According to a twelfth aspect of this invention, there is provided the apparatus of the third aspect wherein said motion connecting unit estimates that the motion state of the front time-series motion data a connection time after the last time of the front time-series motion data is the motion state of the back times-series motion data the connection time after the initial time of the back time-series motion data, and generates estimated-extended motion data.

Therefore, it is possible to provide an apparatus for generating motion data, able to connect two time-series motion data and generate new time-series motion data of which the time length is equal to the sum of those of the two time-series motion data.

According to a thirteenth aspect of this invention, there is provided the apparatus of the fourth aspect wherein said motion connecting unit estimates that the motion state of the back time-series motion data a connection time before the initial time of the back time-series motion data smoothly shifts to the motion state of the front time-series motion data the connection time before the last time of the front time-series motion data, and generates estimated-extended motion data.

Therefore, it is possible to provide an apparatus for generating motion data, able to connect two time-series motion data and generate new time-series motion data of which the time length is equal to the sum of those of the two time-series motion data.

According to a fourteenth aspect of this invention, there is provided the apparatus of the fifth aspect wherein said motion connecting unit calculates a connection time distribution rate in connection, for time-series motion data holding a connection time distribution rate as additional information, based on a connection time distribution rate as additional information for the front time-series motion data and a connection time distribution rate as additional information for the back time-series motion data, and generates an estimated forward-extended motion and an estimated backward-extended motion according to the connection time distribution rate.

Therefore, it is possible to provide an apparatus for generating motion data, able to connect two time-series motion data and generate new time-series motion data of which the time length is equal to the sum of those of the two time-series motion data.

According to a fifteenth aspect of this invention, there is provided the apparatus of the fifth aspect wherein said motion connecting unit calculates a connection time distribution rate $\gamma$ in connection, for time-series motion data holding a connection time distribution rate as additional information, based on a connection time distribution rate $\gamma 1$ as additional information for the front time-series motion data and a connection time distribution rate $\gamma 2$ as additional information for the back time-series motion data, by $\gamma=(\gamma 1+\gamma 2)/2$, and generates an estimated forward-extended motion and an estimated backward-extended motion according to the connection time distribution rate.

Therefore, it is possible to provide an apparatus for generating motion data, able to connect two time-series motion data and generate new time-series motion data of which the time length is equal to the sum of those of the two time-series motion data, and able to vary the connection time distribution rate $\gamma$.

According to a sixteenth aspect of this invention, there is provided the apparatus of any of the third, fourth, and fifth aspects wherein for time-series motion data holding additional information about numerically expressed methods of generating estimated-extended motions, said motion connecting unit generates an estimated-extended motion, an estimated backward-extended motion, and an estimated forward-extended motion, according to the additional information.

Therefore, it is possible to provide an apparatus for generating motion data, able to connect two time-series motion data and generate new time-series motion data of which the time length is equal to the sum of those of the two time-series motion data.

According to a seventeenth aspect of this invention, there is provided the apparatus of the eleventh aspect wherein said motion connecting unit, for time-series motion data holding a value numerically expressing the importance of the time-series motion data as additional information, based on the value of the importance of the additional information for the front time-series motion data and the value of the importance of the additional information for the back time-series motion data, determines a method of generating an estimated backward-extended motion and an estimated forward-extended motion, calculates a connection time distribution rate, and generates an estimated forward-extended motion and an estimated backward-extended motion.

Therefore, it is possible to provide an apparatus for generating motion data, able to connect two time-series motion data and generate new time-series motion data of which the time length is equal to the sum of those of the two time-series motion data.

According to an eighteenth aspect of this invention, there is provided the apparatus of the fifth aspect wherein said motion connecting unit, for time-series motion data holding a value numerically expressing the importance of the time-series motion data as additional information, based on the value $\delta 1$ of the importance of the additional information for the front time-series motion data and the value $\delta 2$ of the importance of the additional information for the back time-series motion data ($0 \leq \delta 1, \delta 2 \leq 1$), determines a method of generating an estimated backward-extended motion and an estimated forward-extended motion, calculates a connection time distribution rate $\gamma$ by $\gamma=(\delta 1-\delta 2+1)/2$, and generates an estimated forward-extended motion and an estimated backward-extended motion.

Therefore, it is possible to provide an apparatus for generating motion data, able to connect two time-series motion data and generate new time-series motion data of which the time length is equal to the sum of those of the two time-series motion data, and able to vary the connection time distribution rate $\gamma$.

According to a nineteenth aspect of this invention, there is provided an apparatus of generating closed-loop periodic motion data, comprising:

a storage unit;

an input/output unit for (a) receiving time-series motion data including the position data of a whole multi-joint rigid body object at each time, and the posture angle data, joint slide vector data, and joint angle data of the multi-joint rigid body object at each time, (b) storing the received time-series motion data in said storage unit, and (c) reading out closed-loop periodic motion data generated from the time-series motion data, stored in said storage unit;

an open periodic motion generating unit for (a) reading out time-series motion data stored in said storage unit, (b) generating open periodic time-series motion data by making the local parts of a multi-joint rigid body object periodic, and (c) storing the open periodic time-series motion data in said storage unit; and a closed-loop motion generating unit for (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

Therefore, it is possible to provide an apparatus for generating closed-loop periodic motion data from single open time-series motion data given for moving a multi-joint rigid body object.

According to a twentieth aspect of this invention, there is provided the apparatus of the nineteenth aspect wherein said apparatus further includes a motion connecting unit for (a) reading out plural time-series motion data stored said storage unit via said data bus, (b) connecting the plural time-series motion data to generate a series of time-series motion data, and (c) storing the series of time-series motion data in said storage unit via said data bus.

Therefore, it is possible to provide an apparatus for generating closed-loop periodic motion data from time-series motion data resulting from connecting plural open time-series motion data given for moving a multi-joint rigid body object.

According to a twenty-first aspect of this invention, there is provided the apparatus of any of the or nineteenth, twentieth aspects wherein said open periodic motion generating unit (a) estimates motion data as much as a synthesis time from the last time of time-series motion data to generate estimated-extended motion data, (b) combines the time-series motion data from the initial time to the synthesis time after and the estimated-extended motion data to generate synthesized motion data, (c) replaces the posture angle data, joint slide vector data, and joint angle data of the time-series motion data from the initial time to the synthesis time after with those of the synthesized motion data, and (d) calculates the amount of parallel translation for the position data of the whole multi-joint rigid body object, performs the parallel translation to the position data of the whole multi-joint rigid body object, and replaces the position data of the time-series motion data from the initial time to the synthesis time after with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-second aspect of this invention, there is provided the apparatus of any of the nineteenth and twentieth aspects wherein said open periodic motion generating unit (a) estimates motion data as much as a synthesis time in the past direction from the initial time of time-series motion data, in terms of time, to generate estimated-extended motion data, (b) combines the time-series motion data from the last time to the synthesis time before and the estimated-extended motion data to generate synthesized motion data, (c) replaces the posture angle data, joint slide vector data, and joint angle data of the time-series motion data from the last time to the synthesis time before with those of the synthesized motion data, and (d) calculates the amount of parallel translation for the position data of the whole multi-joint rigid body object, performs the parallel translation to the position data of the whole multi-joint rigid body object, and replaces the position data of the time-series motion data from the last time to the synthesis time before with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-third aspect of this invention, there is provided the apparatus of any of the nineteenth and twentieth aspects wherein said open periodic motion generating unit (a) estimates motion data as much as $\alpha \times$(a synthesis time) from the last time of time-series motion data, $\alpha$ being a synthesis time distribution rate ($0 \leq \alpha \leq 1$), to generate estimated backward-extended motion data, (b) estimates motion data as much as $(1-\alpha) \times$(the synthesis time) in the past direction from the initial time of time-series motion data, in terms of time, to generate estimated forward-extended motion data, (c) combines the time-series motion data from the initial time to $\alpha \times$(the synthesis time) after and the estimated backward-extended motion data to generate front synthesized motion data, (d) combines the time-series motion data from the last time to $(1-\alpha) \times$(the synthesis time) before and the estimated forward-extended motion data to generate back synthesized motion data, (e) replaces the posture angle data, joint slide vector data, and joint angle data of the time-series motion data from the last time to $\alpha \times$(the synthesis time) after with those of the front synthesized motion data, (f) calculates the amount of parallel translation for the position data of the whole multi-joint rigid body object from the last time to $\alpha \times$(the synthesis time) after, performs the parallel translation to the position data of the whole multi-joint rigid body object from the last time to $\alpha \times$(the synthesis time) after, and replaces the position data of the time-series motion data from the last time to $\alpha \times$(the synthesis time) after with the resulting position data, (g) replaces the posture angle data, joint slide vector data, and joint angle data of the time-series motion data from the last time to $(1-\alpha) \times$(the synthesis time) before with those of the back synthesized motion data, and (h) calculates the amount of parallel translation for the position data of the whole multi-joint rigid body object from the last time to $(1-\alpha) \times$(the synthesis time) before, performs the parallel translation to the position data of the whole multi-joint rigid body object from the last time to $(1-\alpha) \times$(the synthesis time) before, and replaces the position data of the time-series motion data from the last time to $(1-\alpha) \times$(the synthesis time) before with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-fourth aspect of this invention, there is provided the apparatus of any of the nineteenth and twentieth aspects wherein said closed-loop motion generating unit performs parallel translation, using a monotonically increasing function, to the position data of the whole multi-joint rigid body object from the last time to an effect time before, among the time-series motion data, in a way to match the position data of the whole multi-joint rigid body object at the last time to that at the initial time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to the twenty-fifth aspect of this invention, there is provided the apparatus of any of the nineteenth and twentieth aspects wherein said closed-loop motion generating unit performs parallel translation to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-sixth aspect of this invention, there is provided the apparatus of any of the nineteenth and twentieth aspects wherein said closed-loop motion generating unit performs parallel translation to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time, and raising the result to the power of $\beta$ ($1 \leq \beta$).

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-seventh aspect of this invention, there is provided the apparatus of any of the twenty-first, twenty-second, and twenty-third aspects wherein said open periodic motion generating unit uses a function that (a) is 1 at the initial time of the synthesis time, and 0 at the last time of the synthesis time, (b) decreases monotonically, (c) is differentiable, and (d) is rotationally symmetrical by 180 degrees about the middle time of the synthesis time, within the synthesis time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-eighth aspect of this invention, there is provided the apparatus of any of the twenty-first, twenty-second, and twenty-third aspects wherein said open periodic motion generating unit uses a function that (a) is 0 at the initial time of the synthesis time, and 1 at the last time of the synthesis time, (b) increases monotonically, (c) is differentiable, and (d) is rotationally symmetrical by 180 degrees about the middle time of the synthesis time, within the synthesis time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a twenty-ninth aspect of this invention, there is provided the apparatus of any of the nineteenth and twentieth aspects wherein said input/output unit receives time-series motion data compressed in advance, and said apparatus further includes a decompression unit for decompressing the compressed time-series motion data, and storing the decompressed time-series motion data in said storage unit.

Therefore, it is possible to provide an apparatus for generating closed-loop periodic motion data from single or plural open time-series motion data given for moving a multi-joint rigid body object, compressed in advance, transmitted via a communications network, such as the Internet.

According to a thirtieth aspect of this invention, there is provided a method of generating motion data, comprising:
storing plural time-series motion data; and
connecting motions by reading out plural time-series motion data from said storage unit, connecting the plural time-series motion data to generate a series of time-series motion data, and storing the series of time-series motion data in said storage unit.

Therefore, it is possible to provide a method for generating motion data, able to connect plural time-series motion data and generate new time-series motion data.

According to a thirty-first aspect of this invention, there is provided a method of generating motion data, comprising:
storing two time-series motion data to be connected, the two time-series motion data being referred to as front time-series motion data and back time-series motion data, respectively; and
connecting motions by estimating motion data in future or past as much as a connection time, in terms of time, for either the front time-series motion data or the back time-series motion data, to generate estimated-extended motion data, and synthesizing connecting motion data based on the estimated-extended motion data and motion data in future or past as much as the connection time, in terms of time, for either the front time-series motion data or the back time-series motion data.

Therefore, it is possible to provide a method for generating motion data, able to connect two time-series motion data and generate new time-series motion data of which the time length is equal to the sum of those of the two time-series motion data.

According to a thirty-second aspect of this invention, there is provided the method of the thirty-first aspect wherein said connecting motions, two time-series motion data being referred to as front time-series motion data and back time-series motion data, respectively, includes estimating motion data as much as a connection time from the last time of the front time-series motion data to generate estimated-extended motion data, and generating connecting motion data based on the back time-series motion data from the initial time to the connection time after and the estimated-extended motion data.

Therefore, it is possible to provide a method for generating motion data, able to connect two time-series motion data and generate new time-series motion data of which the time length is equal to the sum of those of the two time-series motion data.

According to a thirty-third aspect of this invention, there is provided the method of the thirty-first aspect wherein said connecting motions, two time-series motion data being referred to as front time-series motion data and back time-series motion data, respectively, includes estimating motion data as much as a connection time in the past direction from the initial time of the back time-series motion data, in terms of time, to generate estimated-extended motion data, and generating connecting motion data based on the front time-series motion data from the last time to the connection time before and the estimated-extended motion data.

Therefore, it is possible to provide a method for generating motion data, able to connect two time-series motion data and generate new time-series motion data of which the time length is equal to the sum of those of the two time-series motion data.

According to a thirty-fourth aspect of this invention, there is provided the method of the thirty-first aspect wherein said connecting motions includes, according to a connection time distribution rate $\gamma$, (a) estimating motion data as much as $\gamma \times$(a connection time) from the last time of the front time-series motion data to generate estimated backward-extended motion data, (b) estimating motion data in the past direction as much as $(1-\gamma) \times$(the connection time) from the initial time of the back time-series motion data, in terms of time, to generate estimated forward-extended motion data, (c) generating a first half of connecting motion data based on the front time-series motion data from the last time to $(1-\gamma) \times$(the connection time) before and the estimated forward-extended motion data, and (d) generating a second half of connecting motion data based on the back time-series motion data from the initial time to $\gamma \times$(the connection time) after and the estimated backward-extended motion data.

Therefore it is possible to provide a method for generating motion data, able to connect two time-series motion data and generate new time-series motion data of which the time length is equal to the sum of those of the two time-series motion data.

According to a thirty-fifth aspect of this invention, there is provided a method of any of the thirty-second, thirty-third, thirty-fourth aspects wherein said connecting motions uses a function that (a) is 0 at the initial time of the connection time, and 1 at the last time of the connection time, (b) increases monotonically, (c) is differentiable, and (d) is rotationally symmetrical by 180 degrees about the middle time of the connection time, within the connection time.

Therefore, it is possible to provide a method for generating motion data, able to connect two time-series motion data and generate new time-series motion data of which the time length is equal to the sum of those of the two time-series motion data.

According to a thirty-sixth aspect of this invention, there is provided the method of any of the thirty-second, thirty-third, and thirty-fourth aspects wherein said connecting motions uses a function that (a) is 1 at the initial time of the connection time, and 0 at the last time of the connection time, (b) decreases monotonically, (c) is differentiable, and (d) is rotationally symmetrical by 180 degrees about the middle time of the connection time, within the connection time.

Therefore, it is possible to provide a method for generating motion data, able to connect two time-series motion data and generate new time-series motion data of which the time length is equal to the sum of those of the two time-series motion data.

According to a thirty-seventh aspect of this invention, there is provided the method of the thirty-second aspect wherein said connecting motions includes estimating that the front time-series motion data at the last time continues as much as a connection time from the last time, and generating estimated-extended motion data.

Therefore, it is possible to provide a method for generating motion data, able to connect two time-series motion data and generate new time-series motion data of which the time length is equal to the sum of those of the two time-series motion data.

According to a thirty-eighth aspect of this invention, there is provided the method of the thirty-third aspect wherein said connecting motions includes estimating that the back time-series motion data at the initial time has continued as much as a connection time in the past direction from the initial time, in terms of time, and generating estimated-extended motion data.

Therefore, it is possible to provide a method for generating motion data, able to connect two time-series motion data and generate new time-series motion data of which the time length is equal to the sum of those of the two time-series motion data.

According to a thirty-ninth aspect of this invention, there is provided the method of the thirty-second aspect wherein said connecting motions includes estimating that motion data smoothly shifts to the front time-series motion data at the last time a connection time after the last time, and generating estimated-extended motion data.

Therefore, it is possible to provide a method for generating motion data, able to connect two time-series motion data and generate new time-series motion data of which the time length is equal to the sum of those of the two time-series motion data.

According to a fortieth aspect of this invention, there is provided the method of the thirty-third wherein said connecting motions includes estimating that the motion state of the back time-series motion data a connection time before the initial time of the back time-series motion data smoothly shifts to the back time-series motion data with the motion state of the back time-series motion data at the initial time, and generating estimated-extended motion data.

Therefore, it is possible to provide a method for generating motion data, able to connect two time-series motion data and generate new time-series motion data of which the time length is equal to the sum of those of the two time-series motion data.

According to a forty-first aspect of this invention, there is provided the method of the thirty-second aspect wherein said connecting motions includes estimating that the motion state of the front time-series motion data a connection time after the last time of the front time-series motion data is the motion state of the back time-series motion data the connection time after the initial time of the back time-series motion data, and generating estimated-extended motion data.

Therefore, it is possible to provide a method for generating motion data, able to connect two time-series motion data and generate new time-series motion data of which the time length is equal to the sum of those of the two time-series motion data.

According to a forty-second aspect of this invention, there is provided the method of the thirty-third aspect wherein said connecting motions includes estimating that the motion state of the back time-series motion data a connection time before the initial time of the back time-series motion data smoothly shifts to the motion state of the front time-series motion data the connection time before the last time of the front time-series motion data, and generating estimated-extended motion data.

Therefore, it is possible to provide a method for generating motion data, able to connect two time-series motion data and generate new time-series motion data of which the time length is equal to the sum of those of the two time-series motion data.

According to a forty-third aspect of this invention, there is provided the method of the thirty-fourth aspect wherein said connecting motions includes calculating a connection time distribution rate in connection, for time-series motion data holding a connection time distribution rate as additional information, based on a connection time distribution rate as additional information for the front time-series motion data and a connection time distribution rate as additional information for the back time-series motion data, and generating an estimated forward-extended motion and an estimated backward-extended motion according to the connection time distribution rate.

Therefore, it is possible to provide a method for generating motion data, able to connect two time-series motion data and generate new time-series motion data of which the time length is equal to the sum of those of the two time-series motion data.

According to a forty-fourth aspect of this invention, there is provided the method of the thirty-fourth aspect wherein said connecting motions includes calculating a connection time distribution rate γ in connection, for time-series motion data holding a connection time distribution rate as additional information, based on a connection time distribution rate γ1 as additional information for the front time-series motion data and a connection time distribution rate γ2 as additional information for the back time-series motion data, by $\gamma=(\gamma 1+\gamma 2)/2$, and generating an estimated forward-extended motion and an estimated backward-extended motion according to the connection time distribution rate.

Therefore, it is possible to provide a method for generating motion data, able to connect two time-series motion data and generate new time-series motion data of which the time length is equal to the sum of those of the two time-series motion data.

According to a forty-fifth aspect of this invention, there is provided the method of any of the thirty-second, thirty-third, and thirty-fourth aspects wherein for time-series motion data holding additional information about numerically expressed methods of generating estimated-extended motions, said connecting motions includes generating an estimated-extended motion, an estimated backward-extended motion, and an estimated forward-extended motion, according to the additional information.

Therefore, it is possible to provide a method for generating motion data, able to connect two time-series motion data and generate new time-series motion data of which the time length is equal to the sum of those of the two time-series motion data.

According to a forty-sixth aspect of this invention, there is provided the method of the thirty-fourth aspect wherein said connecting motions includes, for time-series motion data holding a value numerically expressing the importance of the time-series motion data as additional information, based on the value of the importance of the additional information for the front time-series motion data and the value of the importance of the additional information for the back time-series motion data, determining a method of generating an estimated backward-extended motion and an estimated forward-extended motion, calculating a connection time distribution rate, and generating an estimated forward-extended motion and an estimated backward-extended motion.

Therefore, it is possible to provide a method for generating motion data, able to connect two time-series motion data and generate new time-series motion data of which the time length is equal to the sum of those of the two time-series motion data.

According to a forty-seventh aspect of this invention, there is provided the method of the thirty-fourth aspect wherein said connecting motions includes, for time-series motion data holding a value numerically expressing the importance of the time-series motion data as additional information, based on the value $\delta 1$ of the importance of the additional information for the front time-series motion data and the value $\delta 2$ of the importance of the additional information for the back time-series motion data ($0 \leq \delta 1, \delta 2 \leq 1$), determining a method of generating an estimated backward-extended motion and an estimated forward-extended motion, calculating a connection time distribution rate γ by $\gamma=(\delta 1-\delta 2+1)/2$, and generating an estimated forward-extended motion and an estimated backward-extended motion.

Therefore, it is possible to provide a method for generating motion data, able to connect two time-series motion data and generate new time-series motion data of which the time length is equal to the sum of those of the two time-series motion data.

According to a forty-eighth aspect of this invention, there is provided a method of generating closed-loop periodic motion data, comprising:

administrating inputs and outputs by (a) receiving time-series motion data including the position data of a whole multi-joint rigid body object at each time, and the posture angle data, joint slide vector data, and the joint angle data of the multi-joint rigid body object at each time, (b) storing the received time-series motion data in a storage unit, and (c) reading out closed-loop periodic motion data generated from the time-series motion data, stored in said storage unit;

generating an open periodic motion by (a) reading out time-series motion data stored in said storage unit, (b) generating open periodic time-series motion data by making the local parts of a multi-joint rigid body object periodic, and (c) storing the open periodic time-series motion data in said storage unit; and generating a closed-loop motion generating by (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

Therefore, it is possible to provide a method for generating closed-loop periodic motion data from single open time-series motion data given for moving a multi-joint rigid body object.

According to a forty-ninth aspect of this invention, there is provided the method of the forth-eighth aspect wherein said method further includes connecting motions by (a) reading out plural time-series motion data stored said storage unit via said data bus, (b) connecting the plural time-series motion data to generate a series of time-series motion data, and (c) storing the series of time-series motion data in said storage unit via said data bus.

Therefore, it is possible to provide a method for generating closed-loop periodic motion data from time-series motion data resulting from connecting plural open time-series motion data given for moving a multi-joint rigid body object.

According to a fiftieth aspect of this invention, there is provided the method of any of the forty-eighth and forty-ninth aspects wherein said generating an open periodic motion includes (a) estimating motion data as much as a synthesis time from the last time of time-series motion data to generate estimated-extended motion data, (b) combining the time-series motion data from the initial time to the synthesis time after and the estimated-extended motion data to generate synthesized motion data, (c) replacing the posture angle data, joint slide vector data, and joint angle data of the time-series motion data from the initial time to the synthesis time after with those of the synthesized motion data, and (d) calculating the amount of parallel translation for the position data of the whole multi-joint rigid body object, performing the parallel translation to the position data of the whole multi-joint rigid body object, and replacing the position data of the time-series motion data from the initial time to the synthesis time after with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-first aspect of this invention, there is provided the method of any of the forty-eighth and forty-ninth aspects wherein said generating an open periodic motion includes (a) estimating motion data as much as a synthesis time in the past direction from the initial time of time-series motion data, in terms of time, to generate estimated-extended motion data, (b) combining the time-series motion data from the last time to the synthesis time before and the estimated-extended motion data to generate synthesized motion data, (c) replacing the posture angle data, joint slide vector data, and joint angle data of the time-series motion data from the last time to the synthesis time before with those of the synthesized motion data, and (d) calculating the amount of parallel translation for the position data of the whole multi-joint rigid body object, performing the parallel translation to the position data of the whole multi-joint rigid body object, and replacing the position data of the time-series motion data from the last time to the synthesis time before with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-second aspect of this invention, there is provided the method of any of the forty-eighth and forty-ninth aspects wherein said generating open periodic motion includes (a) estimating motion data as much as $\alpha \times$(a synthesis time) from the last time of time-series motion data, $\alpha$ being a synthesis time distribution rate ($0 \leq \alpha \leq 1$), to generate estimated backward-extended motion data, (b) estimating motion data as much as $(1-\alpha) \times$(the synthesis time) in the past direction from the initial time of time-series motion data, in terms of time, to generate estimated forward-extended motion data, (c) combining the time-series motion data from the initial time to $\alpha \times$(the synthesis time) after and the estimated backward-extended motion data to generate front synthesized motion data, (d) combining the time-series motion data from the last time to $(1-\alpha) \times$(the synthesis time) before and the estimated forward-extended motion data to generate back synthesized motion data, (e) replacing the posture angle data, joint slide vector data, and joint angle data of the time-series motion data from the last time to $\alpha \times$(the synthesis time) after with those of the front synthesized motion data, (f) calculating the amount of parallel translation for the position data of the whole multi-joint rigid body object from the last time to $\alpha \times$(the synthesis time) after, performing the parallel translation to the position data of the whole multi-joint rigid body object from the last time to $\alpha \times$(the synthesis time) after, and replacing the position data of the time-series motion data from the last time to $\alpha \times$(the synthesis time) after with the resulting position data, (g) replacing the posture angle data, joint slide vector data, and joint angle data of the time-series motion data from the last time to $(1-\alpha) \times$(the synthesis time) before with those of the back synthesized motion data, and (h) calculating the amount of parallel translation for the position data of the whole multi-joint rigid body object from the last time to $(1-\alpha) \times$(the synthesis time) before, performing the parallel translation to the position data of the whole multi-joint rigid body object from the last time to $(1-\alpha) \times$(the synthesis time) before, and replacing the position data of the time-series motion data from the last time to $(1-\alpha) \times$(the synthesis time) before with the resulting position data.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-third aspect of this invention, there is provided the method of any of the forty-eighth and forty-ninth aspects wherein in said generating a closed-loop motion, parallel translation is performed, using a monotonically increasing function, to the position data of the whole multi-joint rigid body object from the last time to an effect time before, among the time-series motion data, in a way to match the position data of the whole multi-joint rigid body object at the last time to that at the initial time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-fourth aspect of this invention, there is provided the method of any of the forty-eighth and forty-ninth aspects wherein in said generating a closed-loop motion, parallel translation is performed to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-fifth aspect of this invention, there is provided the method of any of the forty-eighth and forty-ninth aspects wherein in said generating a closed-loop motion, parallel translation is performed to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time, and raising the result to the power of $\beta$ ($1 \leq \beta$).

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-sixth aspect of this invention, there is provided the method of any of the fiftieth, fifty-first, and fifty-second aspects wherein in said generating an open periodic motion, used is a function that (a) is 1 at the initial time of the synthesis time, and 0 at the last time of the synthesis time, (b) decreases monotonically, (c) is differentiable, and (d) is rotationally symmetrical about the middle time of the synthesis time, within the synthesis time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-seventh aspect of this invention, there is provided the method of any of the fiftieth, fifty-first, and fifty-second aspects wherein in said generating an open periodic motion, used is a function that (a) is 0 at the initial time of the synthesis time, and 1 at the last time of the synthesis time, (b) increases monotonically, (c) is differentiable, and (d) is rotationally symmetrical about the middle time of the synthesis time, within the synthesis time.

Therefore, it is possible to provide a method for generating motion data, the method generating an open periodic motion from non-periodic motions, when closed-loop periodic motion data is generated from time-series motion data resulting from connecting single or plural open time-series motion data given for moving a multi-joint rigid body object.

According to a fifty-eighth aspect of this invention, there is provided the method of any of the fifty-seventh and fifty-eighth aspects wherein said administrating inputs and outputs includes receiving time-series motion data compressed in advance, and said method further includes decompressing the compressed time-series motion data, and storing the decompressed time-series motion data in said storage unit.

Therefore, it is possible to provide a method for generating closed-loop periodic motion data from single or plural open time-series motion data given for moving a multi-joint rigid body object, compressed in advance, transmitted via a communications network, such as the Internet.

According to a fifty-ninth aspect of this invention, there is provided a storage medium of storing a program of generating motion data, said program comprising:

storing plural time-series motion data; and connecting motions by reading out plural time-series motion data from said storage unit, connecting the plural time-series motion data to generate a series of time-series motion data, and storing the series of time-series motion data in said storage unit.

Therefore, it is possible to provide a storage medium for storing a program generating motion data, able to connect plural time-series motion data and generate new time-series motion data.

According to a sixtieth aspect of this invention, there is provided a storage medium of storing a program of generating motion data, said program comprising:

storing two time-series motion data to be connected, the two time-series motion data being referred to as front time-series motion data and back time-series motion data, respectively; and connecting motions by estimating motion data in future or past as much as a connection time, in terms of time, for either the front time-series motion data or the back time-series motion data, to generate estimated-extended motion data, and synthesizing connecting motion data based on the estimated-extended motion data and motion data in future or past as much as the connection time, in terms of time, for either the front time-series motion data or the back time-series motion data.

Therefore, it is possible to provide a storage medium for storing a program generating motion data, able to connect two time-series motion data and generate new time-series motion data of which the time length is equal to the sum of those of the two time-series motion data.

According to a sixty-first aspect of this invention, there is provided a storage medium of storing a program of generating closed-loop periodic motion data, said program comprising:

administrating inputs and outputs by (a) receiving time-series motion data including the position data of a whole multi-joint rigid body object at each time, and the posture angle data, joint slide vector data, and the joint angle data of the multi-joint rigid body object at each time, (b) storing the received time-series motion data in a storage unit via a data bus, and (c) reading out closed-loop periodic motion data generated from the time-series motion data, stored in said storage unit via said data bus;

generating an open periodic motion by (a) reading out time-series motion data stored in said storage unit via said data bus, (b) generating open periodic time-series motion data by making the local parts of a multi-joint rigid body object periodic, and (c) storing the open periodic time-series motion data in said storage unit via said data bus; and generating a closed-loop motion generating by (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

Therefore, it is possible to provide a storage medium for storing a program generating a closed-loop periodic motion data from single open time-series motion data given for moving a multi-joint rigid body object.

According to a sixty-second aspect of this invention, there is provided the storage medium of the sixty-first aspect wherein said program further includes connecting motions by (a) reading out plural time-series motion data stored said storage unit via said data bus, (b) connecting the plural time-series motion data to generate a series of time-series motion data, and (c) storing the series of time-series motion data in said storage unit via said data bus.

Therefore, it is possible to provide a storage medium for storing a program generating closed-loop periodic motion data from time-series motion data resulting from connecting plural open time-series motion data given for moving a multi-joint rigid body object.

BRIEF DESCRIPTION OF THE DRAWINGS

FIGS. 6(a) and 6(b) are diagrams of a skeletal structure and a multi-joint rigid body object (human) necessary for explaining the data structure of time-series motion data, respectively.

FIGS. 21(a) and 21(b) are explanatory diagrams of the generation of an estimated-extended motion.

FIGS. 22(a) and 22(b) are explanatory diagrams of the generation of an estimated-extended motion.

FIGS. 25(a) and 25(b) are explanatory diagrams of the generation of an estimated-extended motion.

DETAILED DESCRIPTION OF THE PREFERRED EMBODIMENTS

EMBODIMENT 1

A description will be described of a closed-loop periodic motion data generating apparatus in accordance with a first embodiment of this invention, referring to figures.

Figure 1:
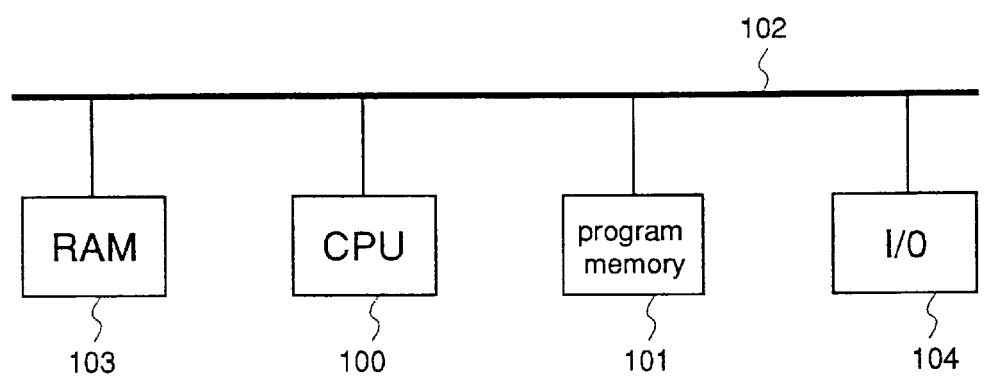
FIG. 1 is a block diagram showing a configuration of a closed-loop periodic motion data generation apparatus in accordance with a first embodiment of the present invention.

FIG. 1 is a configuration of a closed-loop periodic motion data generating apparatus in accordance with the first embodiment. In the figure, reference numeral 100 denotes a CPU for generating closed-loop periodic motion data; 101, a program memory for operating the CPU 100; 103, a RAM as a working area; 104, an I/O unit for receiving time-series motion data from the outside, and outputting the closed-loop periodic motion data generated by the CPU 100; and 102, a data bus.

In the operation of the closed-loop periodic motion data generating apparatus shown in FIG. 1, the I/O unit 104 receives time-series motion data from the outside, the CPU 100 processes the data according to a program stored in the program memory 101, using the RAM 103 as a working area, to generate closed-loop periodic motion data, and the I/O unit 104 outputs the resulting data outside.

Figure 2:
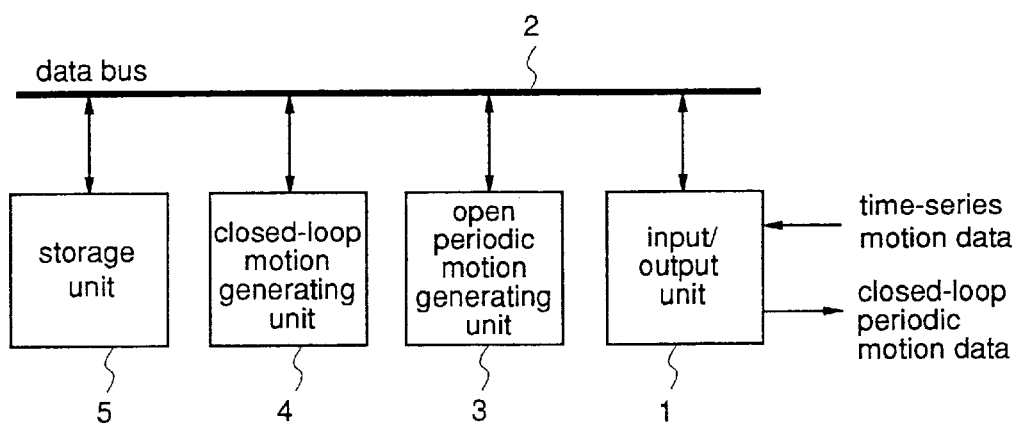
FIG. 2 is a block diagram showing a functional configuration of the closed-loop periodic motion data generation apparatus in accordance with the first embodiment of the present invention.

FIG. 2 shows a functional configuration of a closed-loop periodic motion data generating apparatus in accordance with the first embodiment. In FIG. 2, reference numeral 1 designates an input/output unit for receiving time-series motion data from the outside and outputting closed-loop periodic motion data outside; 2, a data bus for exchanging data between the input/output unit 1 and each unit described below; 3, an open periodic motion generating unit for generating open periodic motion data based on the time-series motion data; 4, a closed-loop periodic motion generating unit for generating a closed-loop periodic motion by connecting the open periodic motions; and 5, a storage unit for storing time-series motion data.

The operation of the closed-loop periodic motion data generation apparatus will be described in detail with reference to FIG. 3.

Figure 3:
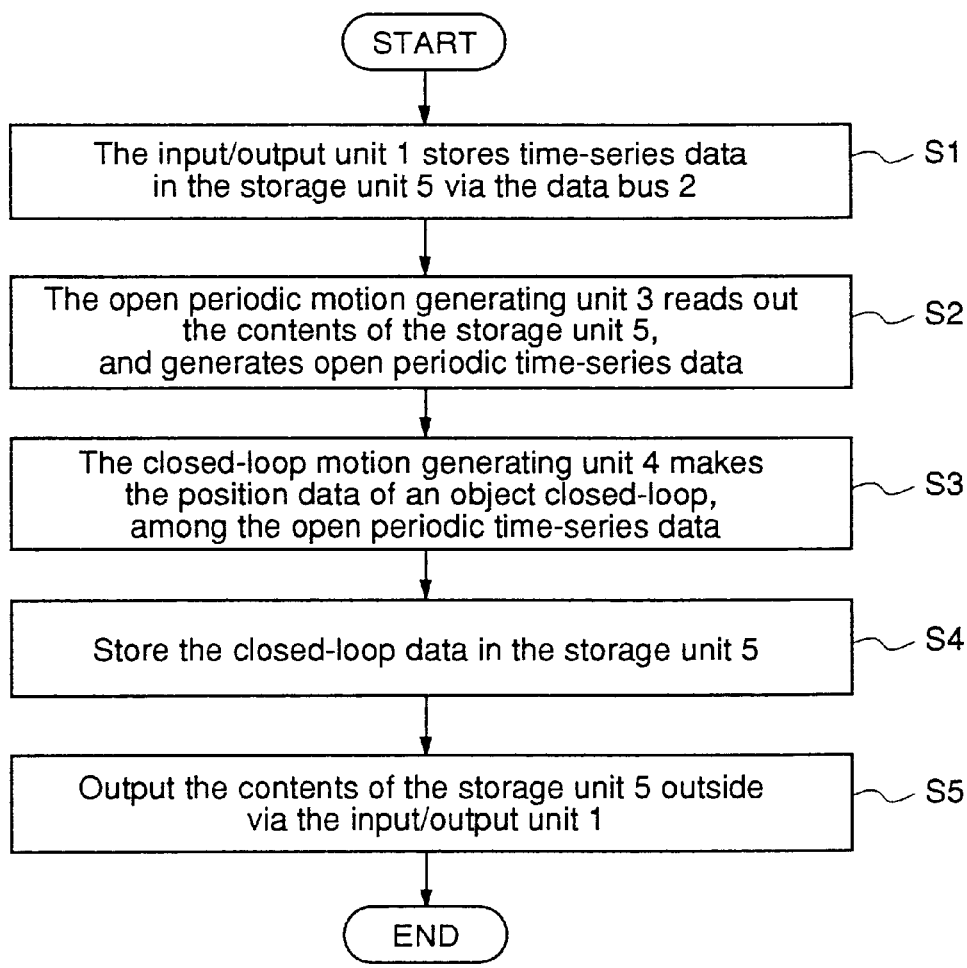
FIG. 3 is a flowchart showing the operation of the closed-loop periodic motion data generation apparatus in accordance with the first embodiment of the present invention.

The input/output unit 1 administrates time-series motion data input from the outside, and stores the time-series motion data in the storage unit 5 via the data bus 2 (see step S1 in FIG. 3). The input/output unit 1 also administrates the external output, that is, reads the closed-loop periodic motion data generated from the time-series motion data, stored in the storage unit 5, via the data bus 2, and outputs the read data outside. The closed-loop periodic motion data has the same structure as general time-series motion data, so the input/output unit 1 is required to output only the general time-series motion data.

The open periodic motion generating unit 3 reads the time-series motion data stored in the storage unit 5 via the data bus 2, generates an open periodic time-series motion data in a way to make the motion of the local part of a multi-joint rigid body object periodic (see step S2 in FIG. 3). There are three methods for generating the open periodic time-series motion data, as follows.

The first method will be explained, referring to FIGS. 14 and 15.

Hereinafter, a motion to be made periodic is referred to as a target periodic motion PM. Initially, time-series data from the last time TT of the target periodic motion PM to a given synthesis time after is estimated to generate an estimated-extended motion EM (see step S81 in FIG. 15).

Figure 15:
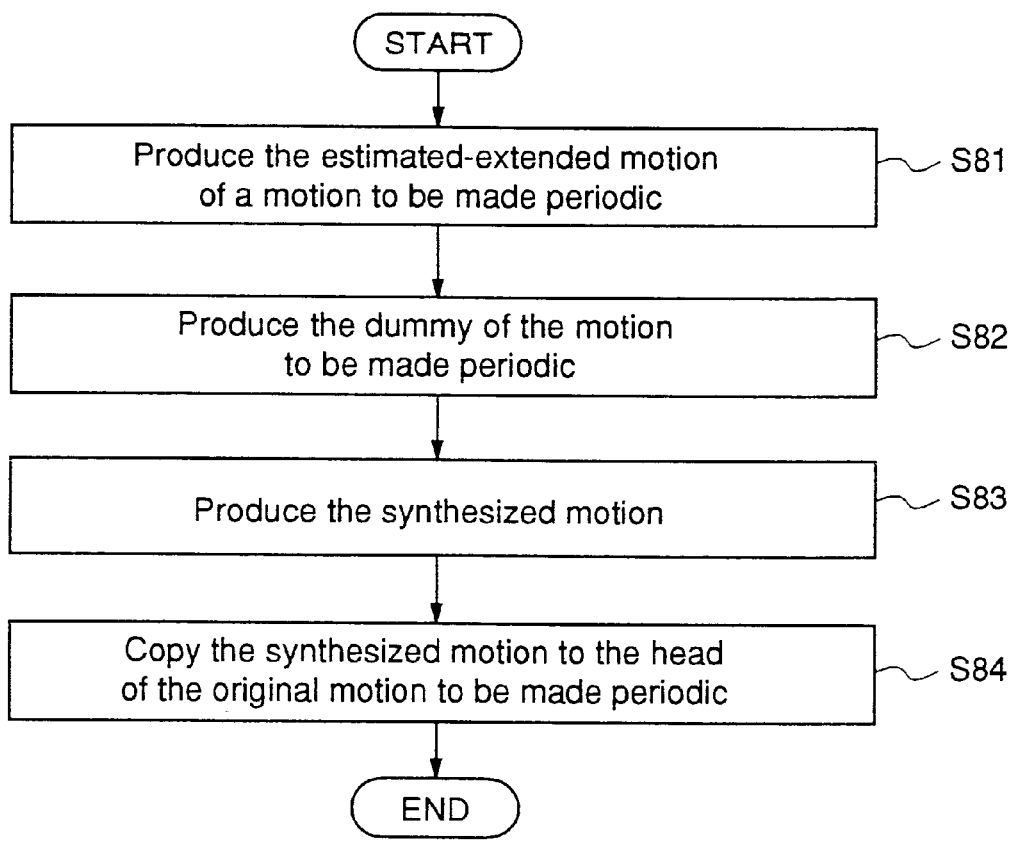
FIG. 15 is a flowchart of the generation of an open periodic motion.

A dummy target periodic motion DPM is generated, which performs the same motion as the target periodic motion PM, but starts at the last time of the target periodic motion PM (see step S82 in FIG. 15). This dummy target periodic motion DPM, and the estimated-extended motion from the initial time to the last time, are combined to synthesize the time-series motion data of the target periodic motion PM of the synthesis time ST. The motion of the synthesized time-series data is called a synthesized motion SM (see step S83 in FIG. 15).

Figure 14:
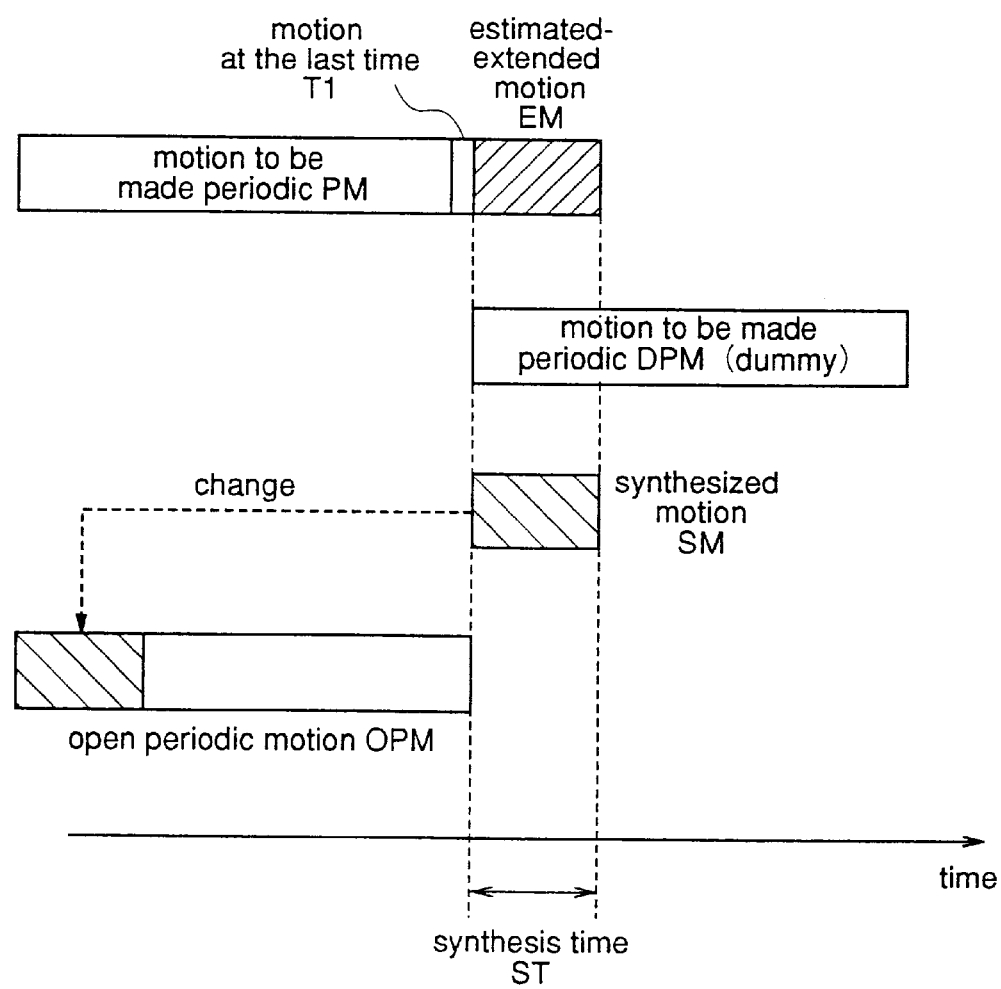
FIG. 14 is an explanatory diagram of the generation of an open periodic motion.

Note that the synthesized motion SM is drawn as a dummy for convenience of the explanation in FIG. 14. The method of the estimation is similar to that described with respect to a motion connecting means described below.

Next, how the synthesized motion is generated will be described.

The velocity of the estimated-extended motion is obtained by calculating the difference between the three dimensional coordinate data indicating the positions of a whole object of the time-series motion data in the synthesis time. That is, the velocity at time i results from the difference in the positions of the whole object between at time i+1 and at time i. The velocity is a three dimensional vector. Similarly, the velocities in the target periodic motion from the initial time to the synthesis time after being calculated. After calculating the velocities, each speed is calculated from the velocity. The speed is defined as the size of the velocity (vector), as in a usual way. The velocities of the estimated-extended motion and the target periodic motion are synthesized with a synthesis function to produce a synthesized velocity.

If it is assumed that the synthesis function takes a value '1' at the initial time and '0' at the last time, decreases monotonically, is n-th-order differentiable, and is rotationally symmetrical by 180 degrees about the value at the middle of the synthesis time, the synthesized velocity is calculated by (the synthesized velocity)=(the velocity of the estimated-extended motion)×(the synthesis function)+(the velocity of the target periodic motion from the initial time to the synthesis time after)×(1−the synthesis function).

This equation indicates a proportional distribution according to the value of the synthesis function. Therefore, if the synthesis function is non-linear with respect to time, the proportion of distribution changes non-linearly with respect to time.

Assuming that the initial time of the synthesis time is t0, the last time of the synthesis time is te, and the present time is T, when time is normalized by $t=(T-t0)/(te-t0)$, there are the following synthesis functions having the t as an independent variable.

(1) $1-t$ (2) $(1+\cos(\pi t))/2$ (3) $(2t+1)(1-t)(1-t)$ (4) $((6t+3)t+1)(1-t)(1-t)(1-t)$ (5) $((((70t+35)t+15)t+5)t+1)(1-t)(1-t)(1-t)(1-t)(1-t)$ In a case of using the synthesis function (1), the synthesis is linear, so the continuity is secured only in the synthesis time. In cases (2) to (5), the synthesis is non-linear. In cases (2) and (3), first-order continuity is secured. In case (4), second-order continuity is secured. In case (5), fourth-order continuity is secured.

On the other hand, if it is assumed that the synthesis function takes a value '0' at the initial time and '1' at the last time, increases monotonically, is n-th-order differentiable, and is rotationally symmetrical by 180 degrees about the value at the middle of the synthesis time, the synthesized velocity is calculated by (the synthesized velocity)=(the velocity of the estimated-extended motion)×(1−the synthesis function)+(the velocity of the target periodic motion from the initial time to the synthesis time after)×(the synthesis function).

When the foregoing normalization is performed, there are the following synthesis functions, (1) $t$ (2) $1-(1+\cos(\pi t))/2$ (3) $1-(2t+1)(1-t)(1-t)$ (4) $1-((6t+3)t+1)(1-t)(1-t)(1-t)$ (5) $1-((((70t+35)t+15)t+5)t+1)(1-t)(1-t)(1-t)(1-t)(1-t)$ The property of each function is similar to the foregoing.

The synthesized speed is also calculated by combining the speed of the estimated-extended motion and that of the target periodic motion from the initial time to the synthesis time after, in a way similar to the calculation of the synthesized velocity. It should be noted that the synthesis function is not necessarily the same as that used in the calculation of the synthesized velocity. The function is appropriately selected, taking into account the smoothness of the connection or the calculation time. Note that the position at the present time i in the synthesis time is calculated from the previous time i−1 by the following equation, (the position at the present time i)=(the position at the previous time i−1)+(the synthesized velocity at the previous time i−1)×(the synthesized speed at the previous time i−1)÷(the size of the synthesized velocity at the previous time i−1).

A front posture vector is calculated from the posture angle of the time-series motion data of the estimated-extended motion. A back posture vector is calculated from the posture angle of the time-series motion data of the target periodic motion from the initial time to the synthesis time after. The front and back posture vectors are combined, in a way similar to the case of the calculation of the synthesized velocity, to produce a synthesized posture vector. Note that the synthesis function is not necessarily the same as that used in the calculation of the synthesized velocity. The synthesis function is appropriately selected, taking into account of smoothness of connection, the calculation time, and so on. A synthesized posture angle is calculated from the synthesized posture vector. The synthesized posture vector corresponds to the synthesized posture angle in a way of one to many, so unless there are no other conditions, the synthesized posture angle cannot be uniquely determined. However, if some conditions about the rotational angles of three direction vectors constituting the posture vector are introduced, the unique determination is possible. For example, the angle of the upward direction vector is restricted to −90° to 90°. This restriction has no influence on the calculation of the synthesized posture vector from the synthesized posture angle.

The direction and amount of a front slide are calculated from the slide vector of a joint in the time-series motion data of the estimated-extended motion. The direction and amount of a back slide are calculated from the slide vector of a joint in the time-series motion data of the target periodic motion from the initial time to the synthesis time after. The direction of a slide is a slide vector itself or a normalized vector the size of '1'. The amount of a slide is the size of a slide vector. The directions of front and back slides, and the amounts of front and back slides are combined, respectively, in a way similar to the case of the above-described calculation of the synthesized velocity, to produce the synthesized direction and amount of the slide. Note that the synthesis function is not necessarily the same as that used in the calculation of the synthesized velocity. The synthesis function is appropriately selected, taking into account the smoothness of connection, the calculation time, and so on. Next, a synthesized slide vector is calculated from the synthesized direction and amount of the slide by (the synthesized slide vector )=(the synthesized direction of the slide)×(the synthesized amount of the slide)÷(the size of the synthesized direction of the slide).

A synthesized joint angle is calculated by combining the joint angle in the time-series motion data of the estimated-extended motion and the joint angle of the time-series motion data of the target periodic motion from the initial time to the synthesis time after, in a way similar to the case of the above-described calculation of the synthesized velocity. Note that the synthesis function is not necessarily the same as in the calculation of the synthesized velocity. The function is appropriately selected, taking into account the smoothness of the connection, or the calculation time, or the like.

Among the target periodic time-series data from the initial time to the synthesis time after, the posture angle data, the slide vector data of a joint, and joint angle data are replaced with those of the time-series data of the synthesized motion, as shown in FIG. 14 (see step S84 in FIG. 15). The amount of parallel transmission are calculated for the position data of the whole object in a way in which, by the parallel translation, the position data of the whole object in the synthesized motion at the last time of the synthesis time matches the position data of the whole object in the target periodic motion at the time the synthesis time after the initial time. This parallel translation is applied to the position data of the whole object in the synthesis motion to generate open periodic time-series motion data.

Next, the second method will be explained with reference to FIGS. 16 and 17. In the second method, for the time-series data of the target periodic motion PM, the dummy target periodic motion DPM is generated in such a way as that the motion at the last time matches the motion IT at the initial time (see step S91 in FIG. 17). The dummy target periodic motion is estimated in the past direction from the initial time to a synthesis time before, to generate an estimated-extended motion EM (see step S92 in FIG. 17). As described above, in FIG. 16, the estimated-extended motion is generated for the dummy for convenience of explanation. As to the generation of a synthesized motion, the time-series motion data of the estimated-extended motion, and those of the target periodic motion in the past direction from the last time to the synthesis time before, are processed in a way similar to the first method (see step S93 in FIG. 17). Note that the method of the estimation is similar to that described with respect to a motion connecting means described below.

Figure 16:
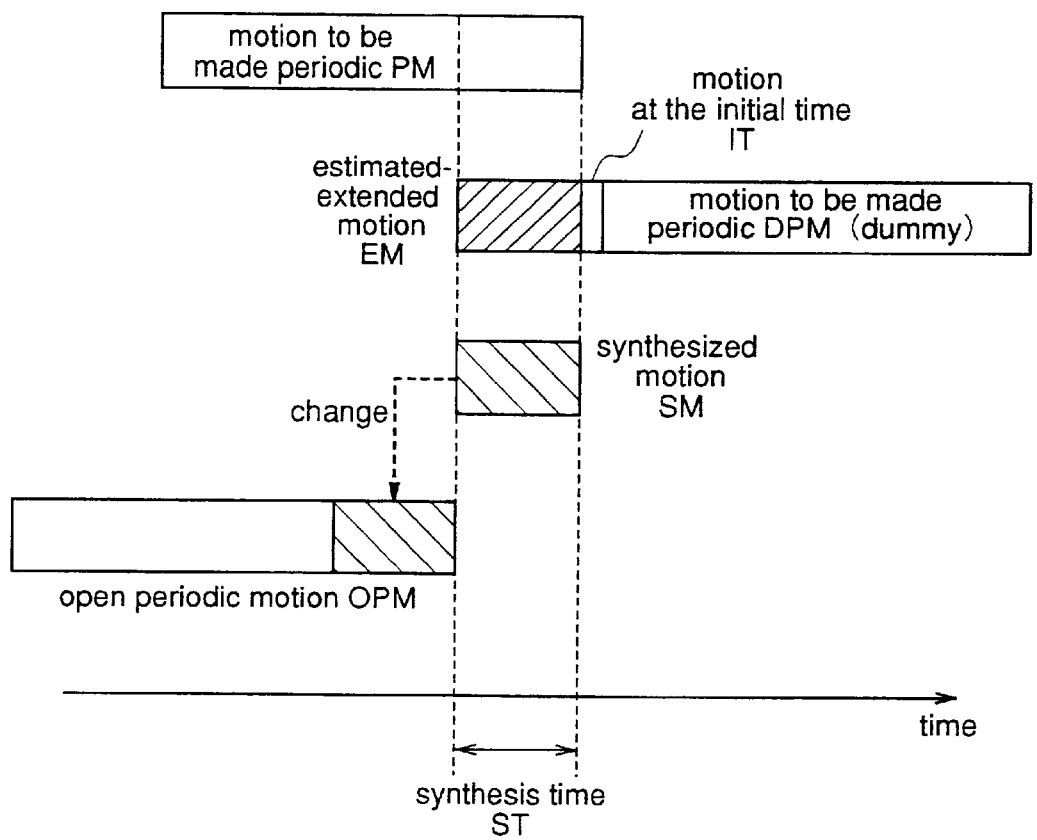
FIG. 16 is an explanatory diagram of the generation of an open periodic motion.
Figure 17:
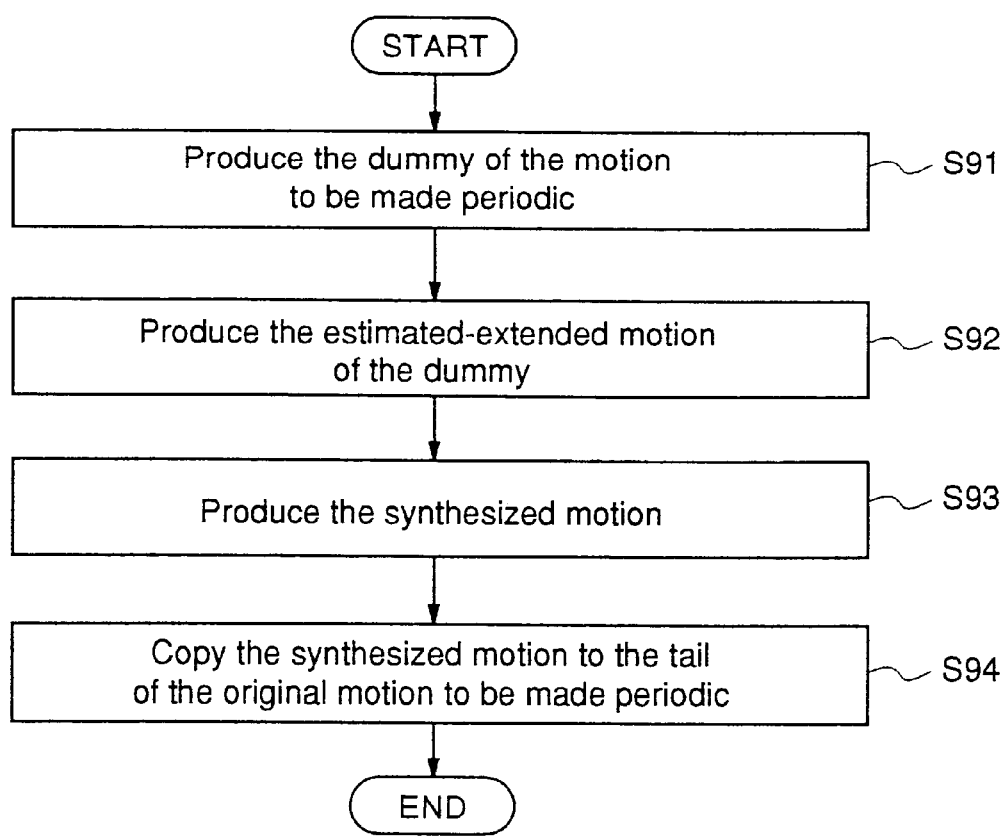
FIG. 17 is a flowchart of the generation of an open periodic motion.

Among the target periodic time-series motion data in the past direction from the last time to the synthesis time before, the posture angle data, the slide vector data of a joint, and joint angle data are replaced with those of the time-series of the synthesized motion SM, as shown in FIG. 16 (see step S94 in FIG. 17). The amounts of parallel translation are calculated for the position data of the whole object in a way in which, by the parallel translation, the position data of the whole object in the synthesized motion at the initial time of the synthesis time matches the position data of the whole object in the target periodic motion the synthesis time before the last time. This parallel translation is applied to the position data of the whole object among the synthesized motion to generate open periodic time-series motion data.

The third method will be explained, referring to FIGS. 18 and 19. In the third method, time-series data from the last time TT of the target periodic motion PM to α×(a synthesis time) after is estimated to generate estimated backward-extended motion EBM (see step S101 in FIG. 19). A dummy target periodic motion DPM is generated, which performs the same motion as the target periodic motion PM, and of which the initial time matches the last time of the target periodic motion PM (see step S102 in FIG. 19). Time-series data in the past direction from the initial time of the dummy target periodic motion DPM to (1−α)×(the synthesis time) before is estimated to generate estimated forward-extended motion EFM (see step S103 in FIG. 19). Note that α is a real number of $0 \leq \alpha \leq 1$, called a synthesis time distribution rate.

Figure 27:
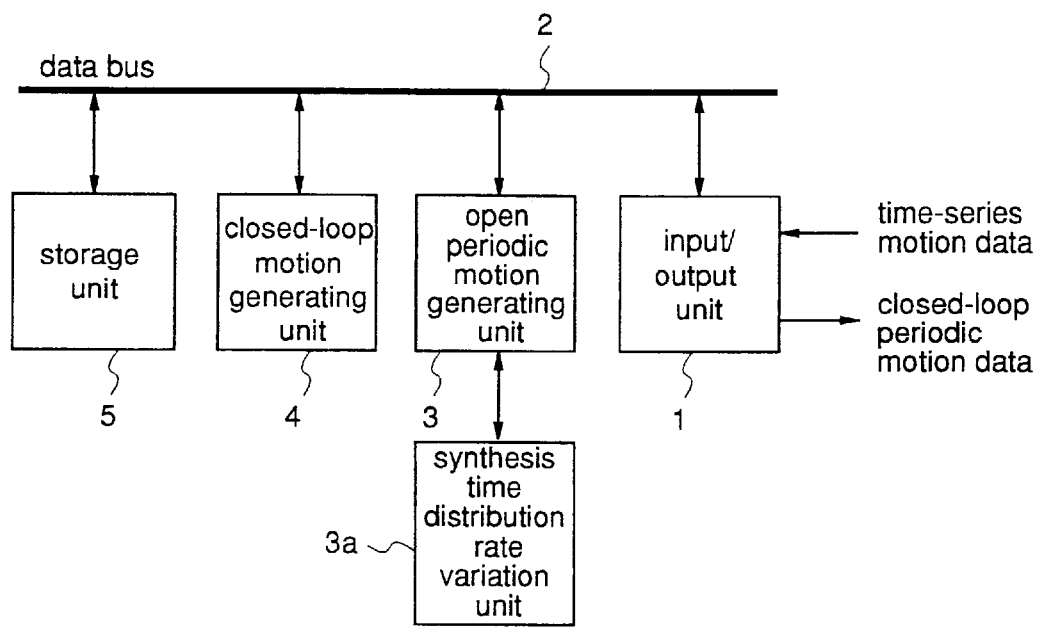
FIG. 27 is a diagram showing a functional configuration of the closed-loop periodic motion data generation apparatus according to the first embodiment, further including a synthesis time distribution rate variation unit.

As shown in FIG. 27, if a synthesis time distribution variation unit 3a is set up in the open periodic motion generating unit 3, the user can vary the synthesis time distribution rate.

As described above, for convenience of the explanation, the estimated forward-expanded motion is generated for the dummy DPM. In this case, the time-series motion data of the target periodic motion in the past direction from the last time to (1−α)×(the synthesis time) before and the time-series motion data of the estimated backward-extended motion, and the time-series motion data of the estimated forward-extended motion and the time series motion data of the target periodic motion from the initial time to the αx(the synthesis time) after, are combined by a way similar to the first method. The synthesized motion can be divided into a backward synthesized motion SBM from the initial time of the synthesis time to (1−α)×(the synthesis time) after, and a forward synthesized motion SFM of the remaining αx(the synthesis time). Note that the method of the estimation is similar to that described with respect to a motion connecting means described below.

Figure 18:
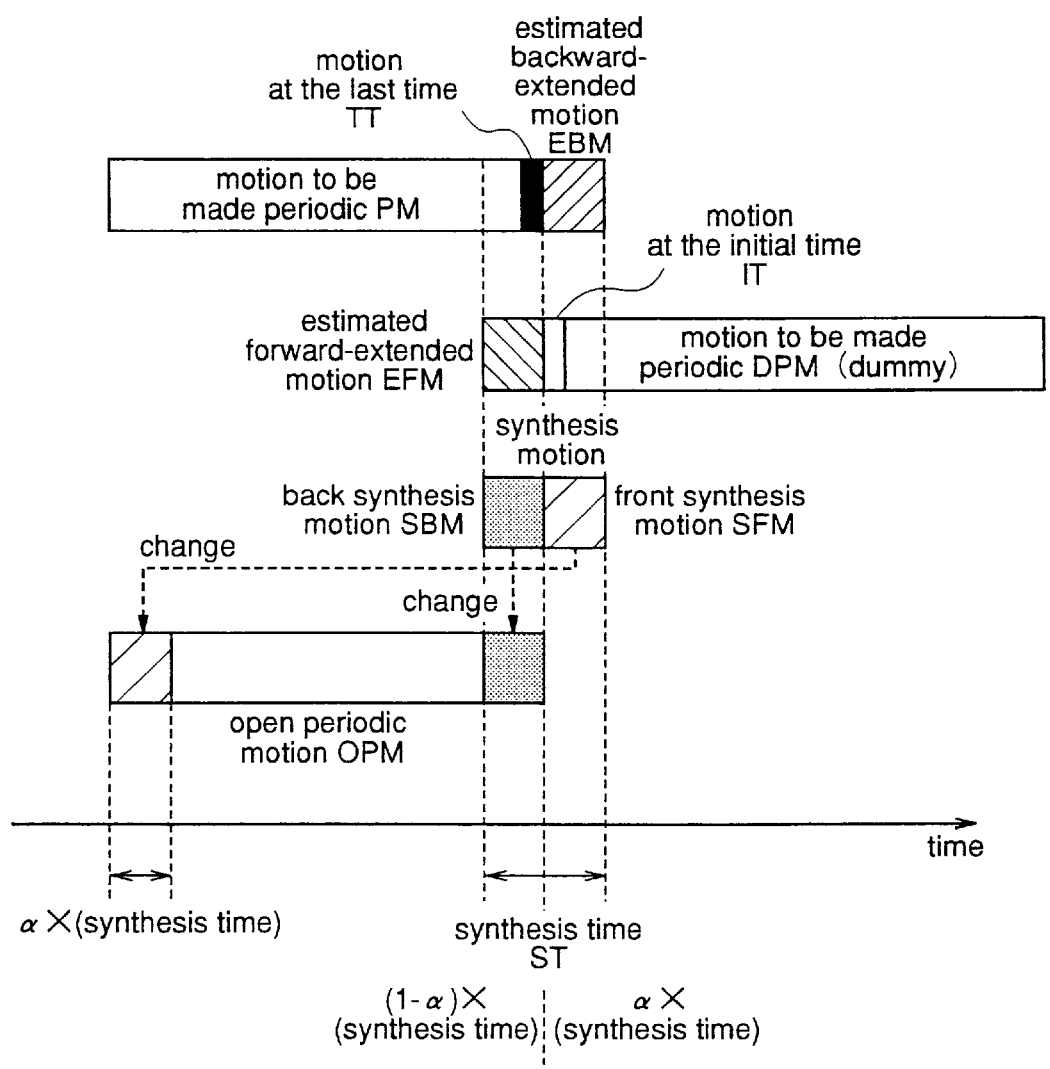
FIG. 18 is an explanatory diagram of the generation of an open periodic motion.
Figure 19:
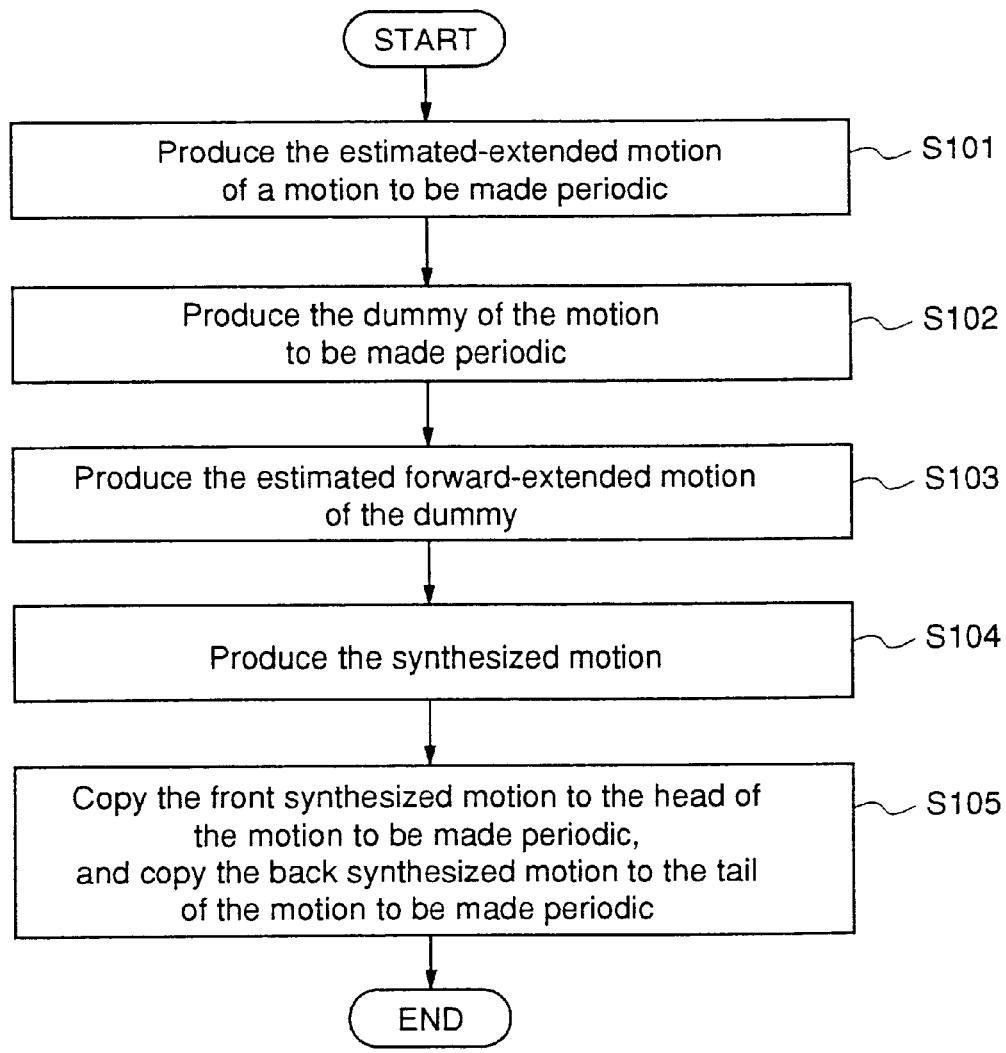
FIG. 19 is a flowchart of the generation of an open periodic motion.
Figure 20:
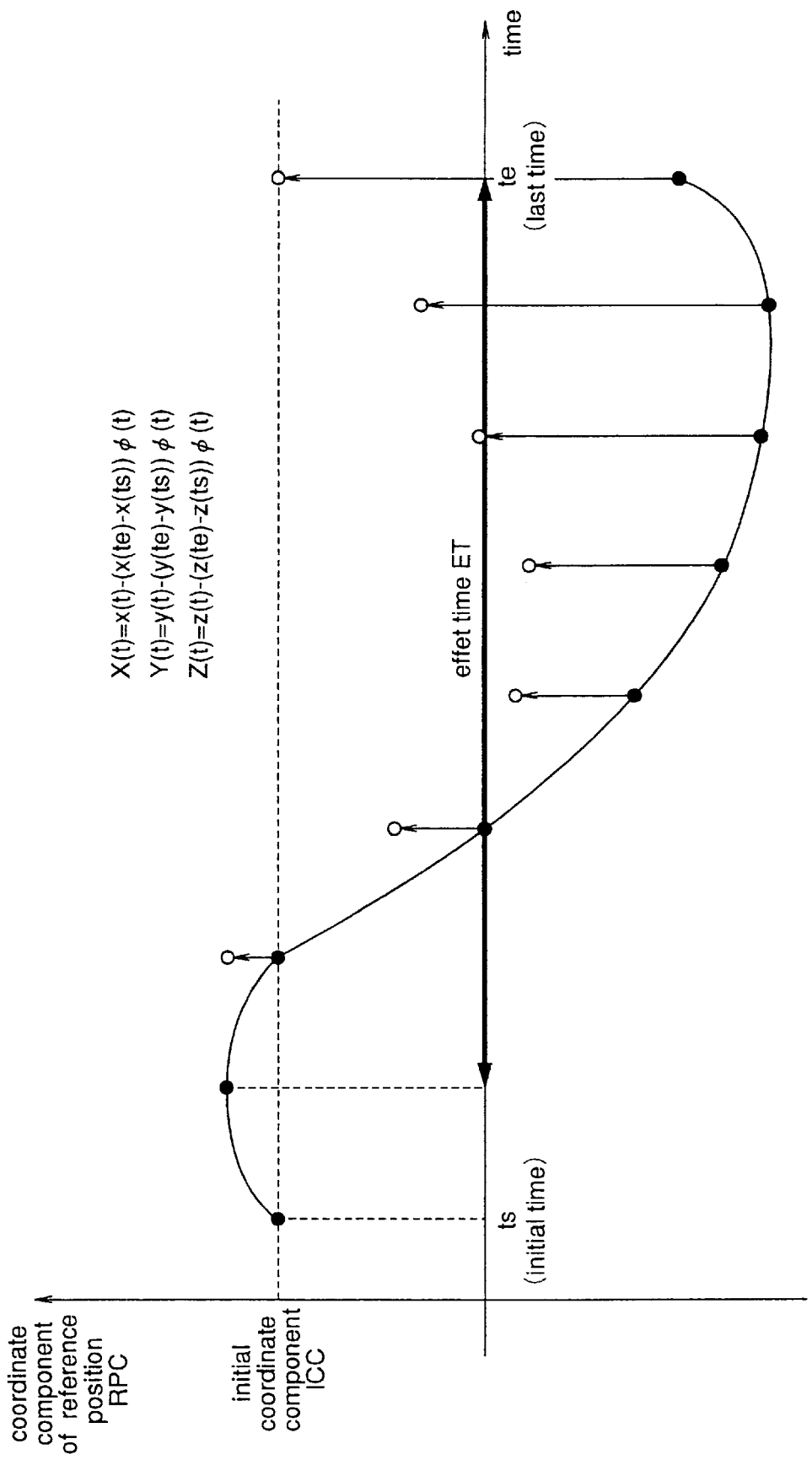
FIG. 20 is an explanatory diagram of the generation of a closed-loop motion.

Among the target periodic time-series motion data from the initial time to αx(the synthesis time) after, the posture angle data, the slide vector data of a joint, and joint angle data are replaced with those of the time-series of the forward synthesized motion SFM, as shown in FIG. 18. The amounts of parallel translation are calculated for the position data of the whole object in a way in which, by the parallel translation, the position data of the whole object in the forward synthesized motion at the initial time of the synthesis time matches the position data of the whole object in the target periodic motion at the time αx(the synthesis time) after the initial time. This parallel translation is applied to the position data of the whole object in the synthesized motion. Among the target periodic time-series motion data in the past direction from the last time to (1-α)×(the synthesis time) before, the posture angle data, the slide vector data of a joint, and joint angle data are replaced with those of the time-series of the backward synthesized motion SBM, as shown in FIG. 18 (see step S105 in FIG. 19). The amounts of parallel translation are calculated for the position data of the whole object in a way in which, by the parallel translation, the position data of the whole object in the backward synthesized motion at the initial time of the synthesis time matches the position data of the whole object in the target periodic motion at the time (1-α)×(the synthesis time) before the initial time. This parallel translation is applied to the position data of the whole object in the synthesized motion. Thus, open periodic time-series motion data is generated.

The time-series motion data of the open periodic time-series motion generated by one of the three methods is stored in the storage unit 5 via the data bus 2.

The closed-loop motion generating unit 4 reads out the position data of an object among the open periodic time-series motion data, and processes the data in the following way to make the open periodic motion a closed-loop (see step S3 in FIG. 3). The process of making a closed-loop will be described with reference to FIG. 11.

As described above, the position data of a whole object represents the time-series data of the coordinate values of the representing point indicating the position of a whole object (reference position). The position data of a whole object is represented by (x(t), y(t), x(t)), where t is time. The initial time of the time-series data is represented by ts; and the last time, te. φ(t) is a function defined at an interval [0,1], increasing monotonically, where φ(0)=0, and φ(1)=1. A predetermined effect time is represented by T. The position data of a whole object, (x(t), y(t), z(t), where t is from te−T to te, is processed by the following equations to produce (X(t), Y(t), Z(t)), which is newly regarded as the position data of a whole object to make the position data closed-loop.

$$X(t)=x(t)-(x(\text{te})-x(\text{ts}))\times\phi((t-\text{te})/T)$$

$$Y(t)=y(t)-(y(\text{te})-y(\text{ts}))\times\phi((t+T-\text{te})/T)$$

$$Z(t)=z(t)-(z(\text{te})-z(\text{ts}))\times\phi((t+t-\text{te})/t$$

where te−t≦t≦te.

Note that t, t to the power of β(1≦β), or the like can be used as φ(t).

The position data of a whole object in the open periodic time-series motion data having been stored in the storage unit 5 is replaced with the closed-loop position data of the whole object data via the data bus 2. The closed-loop motion data is stored in the storage unit 5.

Thus, a closed-loop periodic motion can be generated. This closed-loop data is stored in the storage unit 5 (see step S4 in FIG. 3). The contents of the storage unit 2 are output outside via the input/output unit 1 (see step S5 in FIG. 3).

According to the closed-loop periodic motion data generation apparatus of the first embodiment, the motion time at the head or tail of an open non-periodic motion is extended by estimation. This extended motion and the tail or head of the open non-periodic motion are combined to generate a synthesized motion. The synthesized motion replaces the head or tail of the open non-periodic motion. As a result, an open periodic motion can be produced without changing the time-length of an open non-periodic motion.

It should be noted that the first embodiment of this invention can be realized as a computer program. Therefore, the program can be transmitted via some storage medium.

EMBODIMENT 2

An explanation will be given of a closed-loop periodic motion data generation apparatus in accordance with a second embodiment of this invention, referring to figures.

Figure 4:
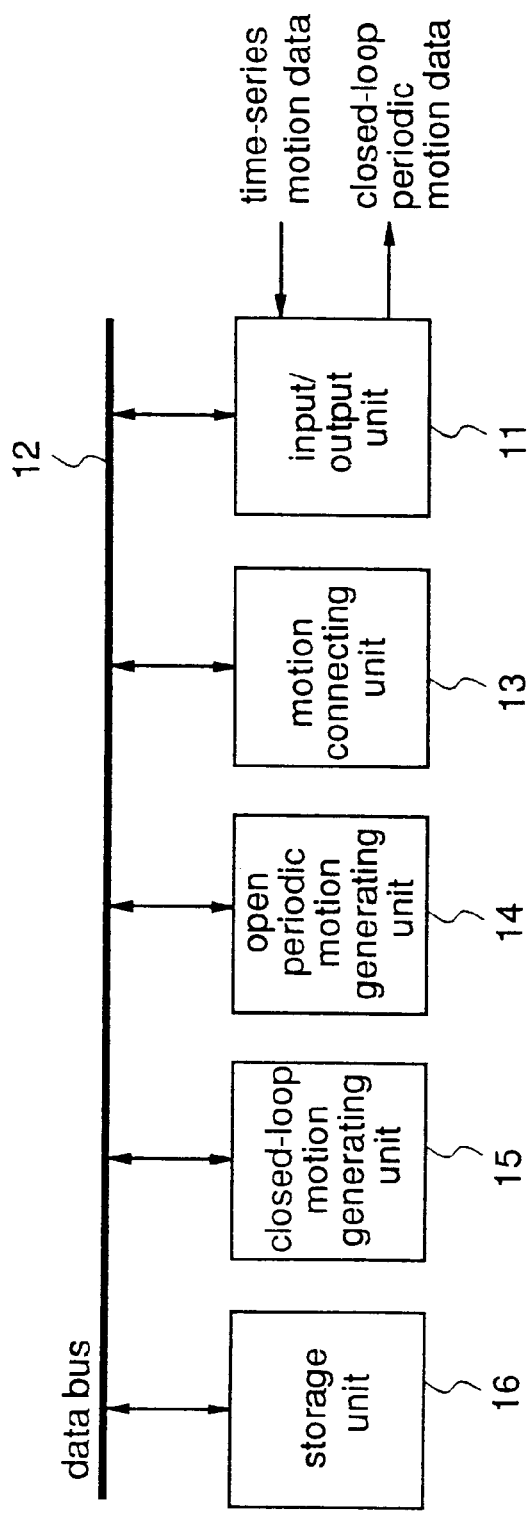
FIG. 4 is a block diagram showing a functional configuration of a closed-loop periodic motion data generation apparatus in accordance with a second embodiment of the present invention.

FIG. 4 shows a configuration of the closed-loop periodic motion generation apparatus in accordance with the second embodiment of this invention. The apparatus shown in FIG. 4 has a configuration similar to that of the apparatus in accordance with the first embodiment.

In FIG. 4, reference numeral 11 indicates an input/output unit for receiving time-series motion data from the outside, and outputting closed-loop periodic motion data outside; 12, a data bus for exchanging data between the input/output unit 11 and each unit described below; 13, a motion connecting unit for connecting the time-series motion data received from the outside; 14, an open periodic motion generating unit for generating an open periodic motion based on the time-series motion data; 15, a closed-loop motion generating unit for connecting open periodic motions to generate a closed-loop motion; and 16, a storage unit for the time-series motion data.

The operation of the closed-loop periodic motion data generation apparatus will be described in detail with reference to FIG. 5.

Figure 5:
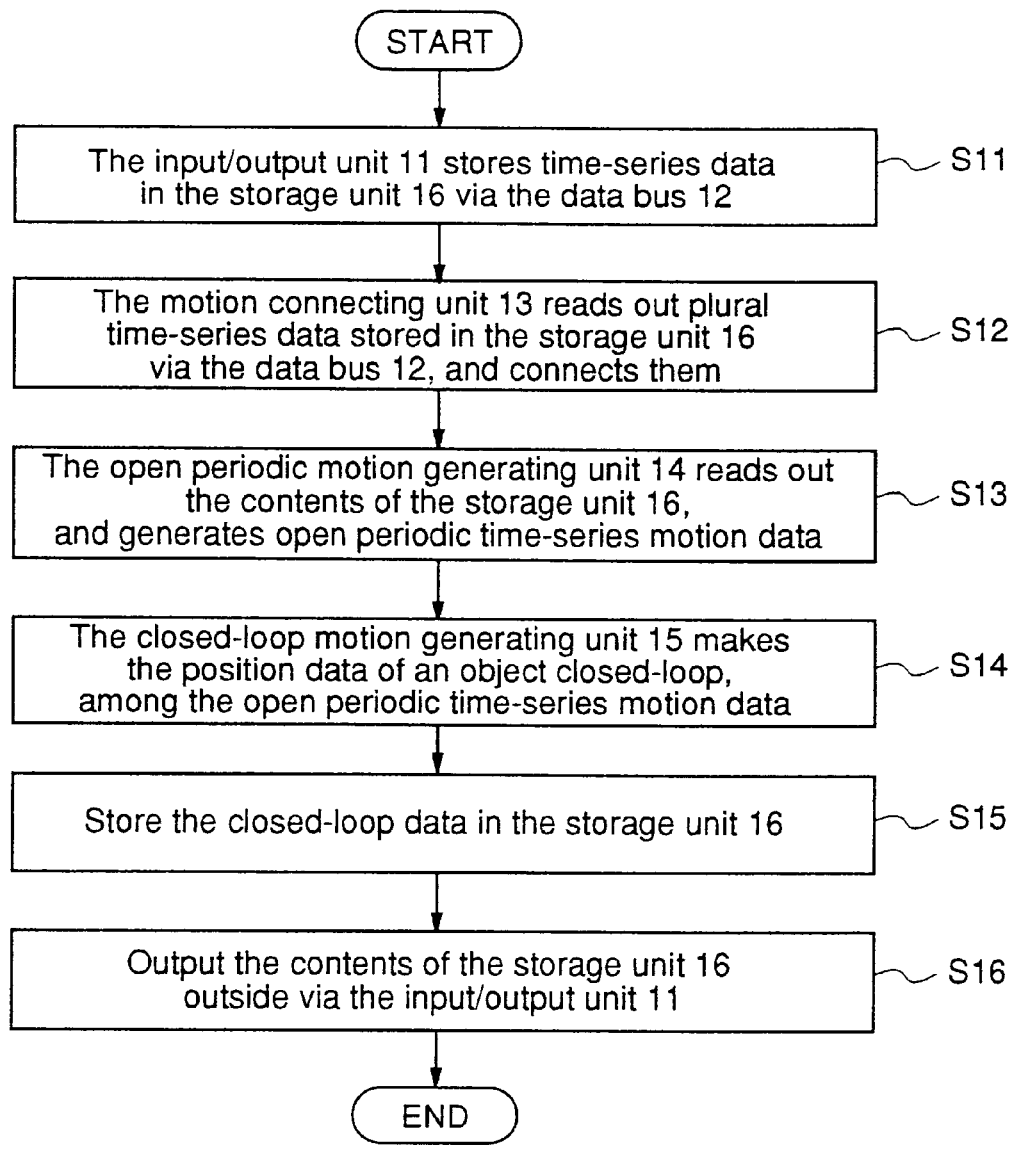
FIG. 5 is a flowchart showing the operation of the closed-loop periodic motion data generation apparatus in accordance with the second embodiment of the present invention.
Figure 7:
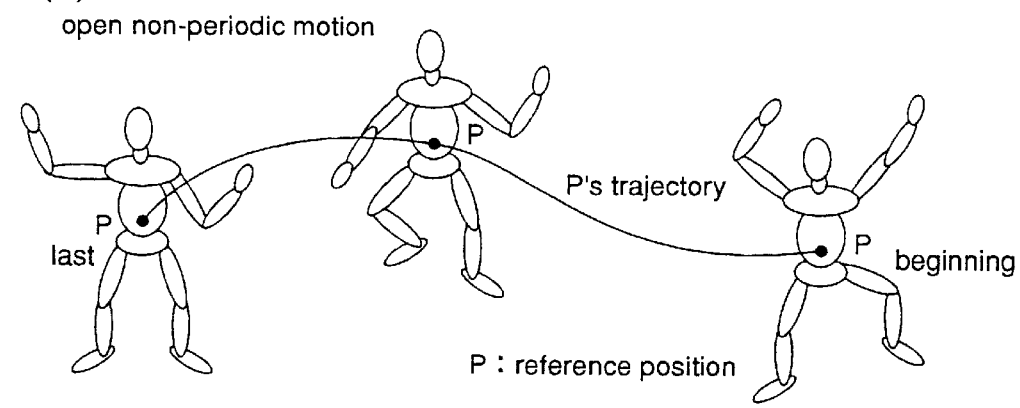
FIGS. 7(a), 7(b), and 7(c) are explanatory diagrams of an open non-periodic motion, an open periodic motion, and a closed-loop periodic motion, respectively.
Figure 7:
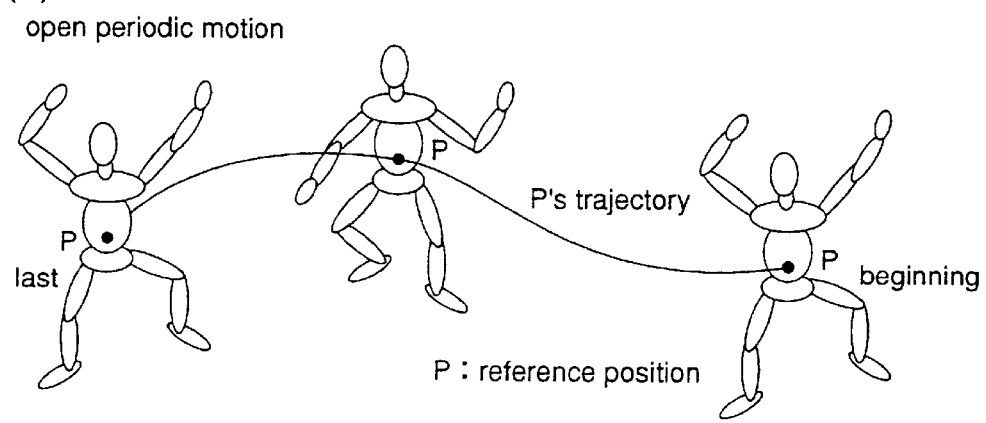
Figure 7:
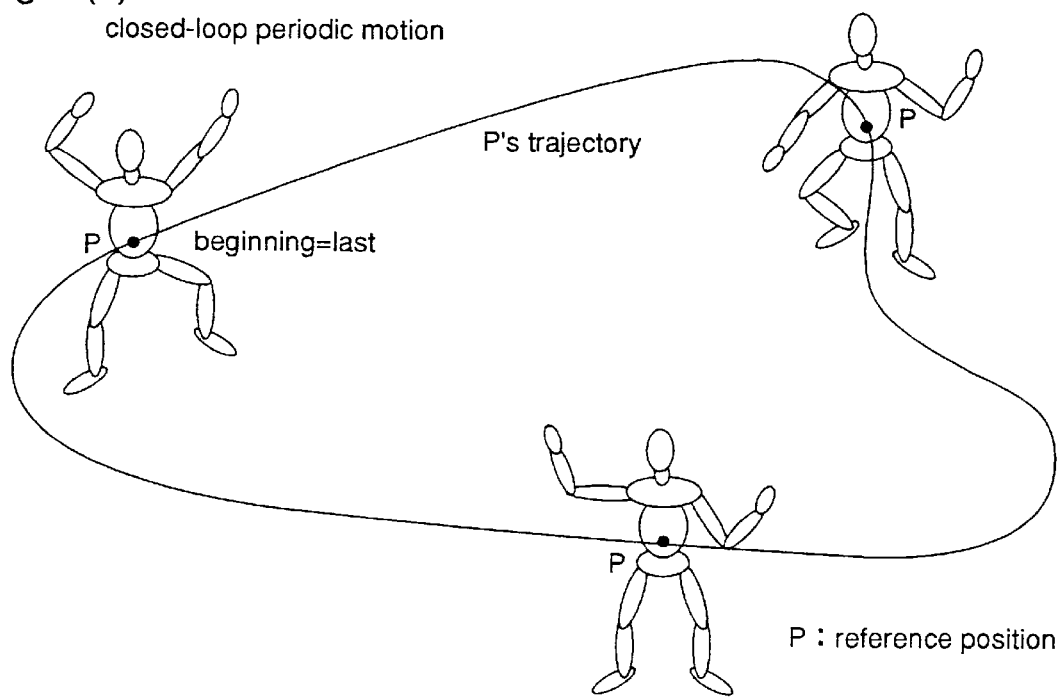

The input/output unit 11 processes plural time-series motion data, as in the first embodiment (see step S11 in FIG. 5).

The motion connecting unit 13 reads out plural time-series motion data stored in the storage unit 16 via the data bus 12, and connecting the plural time-series motion data to generate a series of time-series motion data (see step S12 in FIG. 5). For the generation, there are three processing methods.

Figure 8:
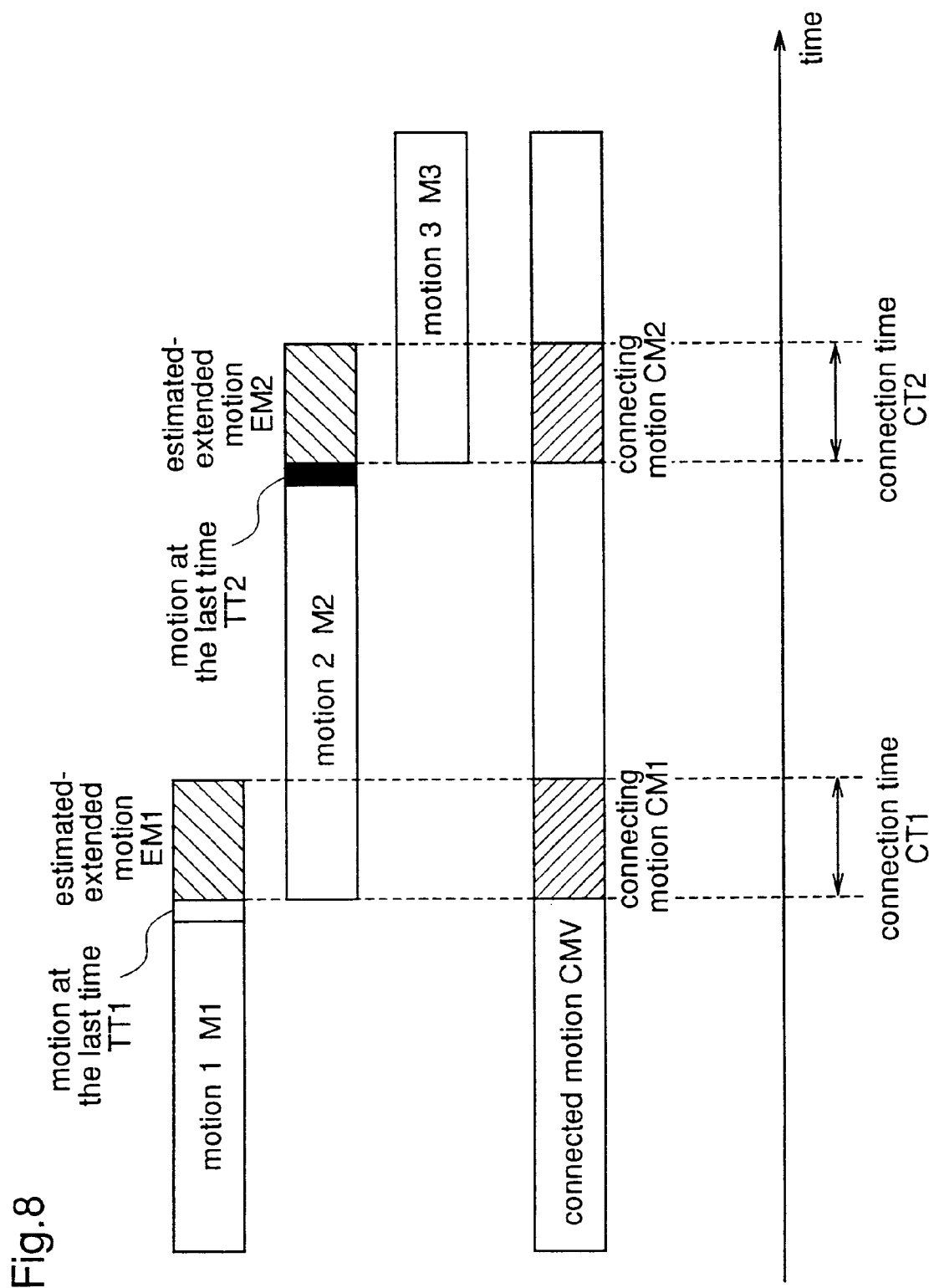
FIG. 8 is an explanatory diagram of motion connection in the second embodiment of this invention.
Figure 10:
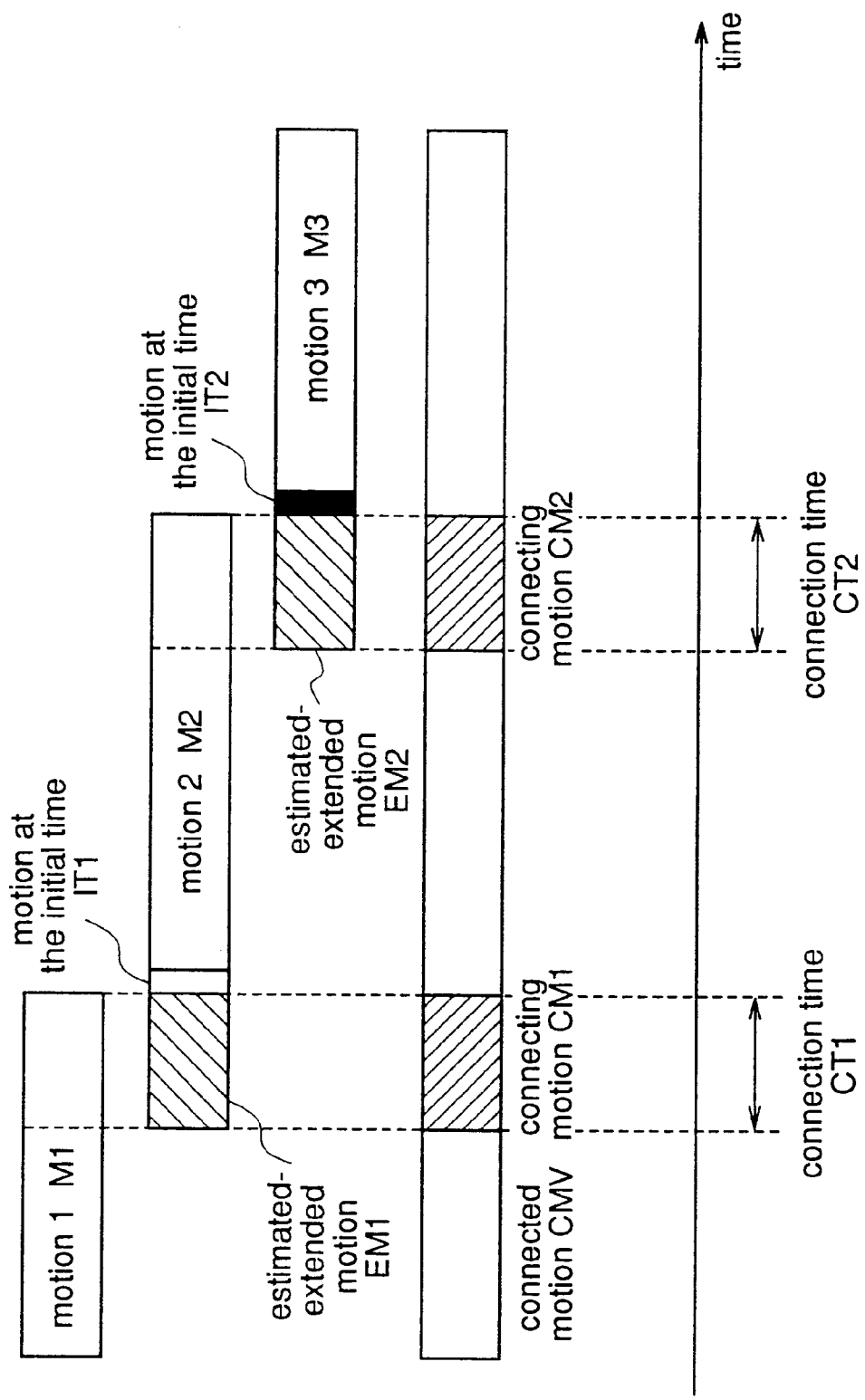
FIG. 10 is an explanatory diagram of motion connection in the second embodiment of this invention.
Figure 12:
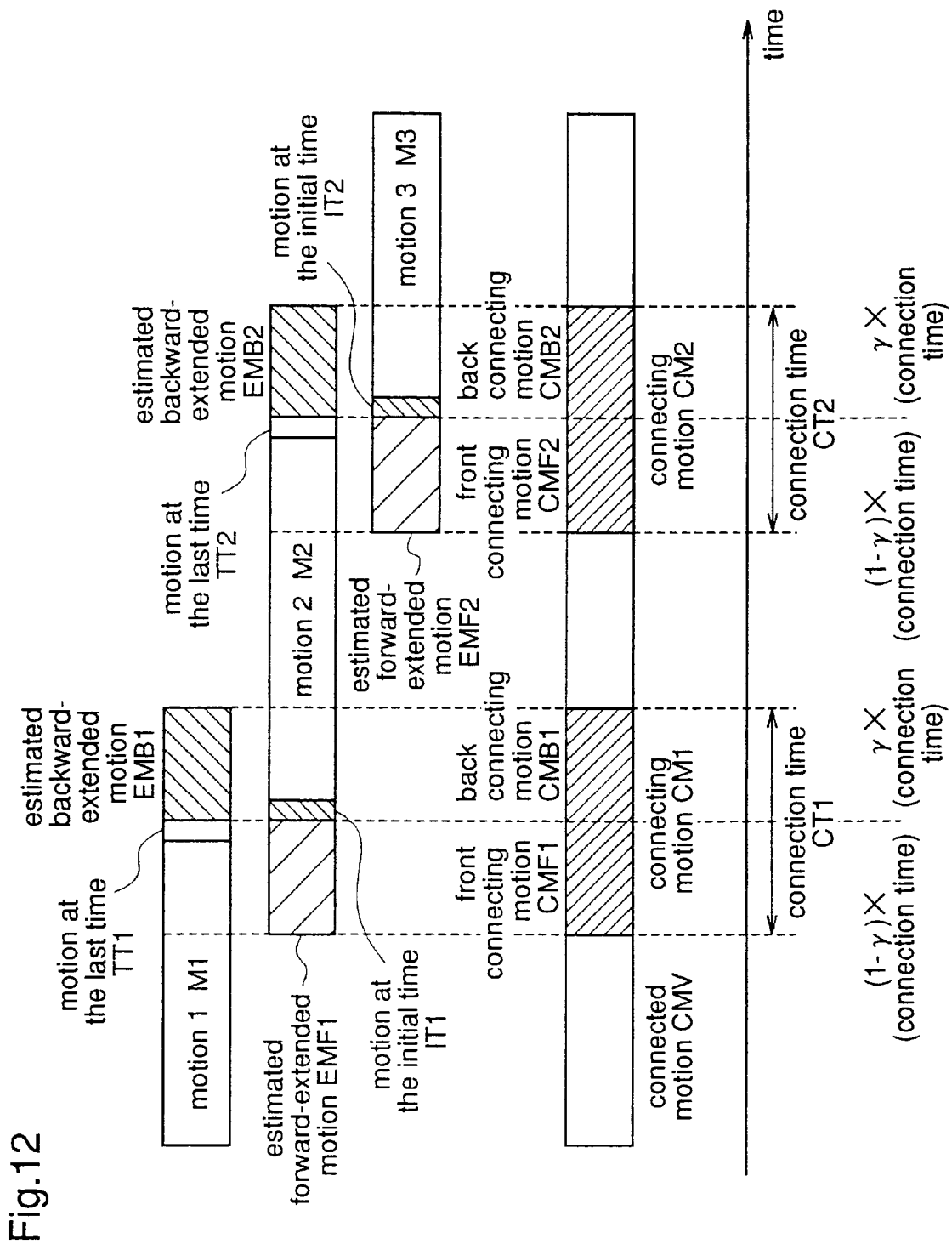
FIG. 12 is an explanatory diagram of motion connection in the second embodiment of this invention.

A first processing method will be explained using FIG. 8; a second processing method, using FIG. 10; and a third processing method, using FIG. 12. In FIGS. 8, 10, and 12, three motions 1M1, 2M2, and 3M3 are connected. For example, the motion 1M1 and the motion 2M2 are initially connected to each other, and the resulting motion is connected to the motion 3M3. Thus, an arbitrary number of motions can be connected to each other by repeating connection of two motions, so only the connection of the motions 1M1 and 2M2 will be described here.

Figure 9:
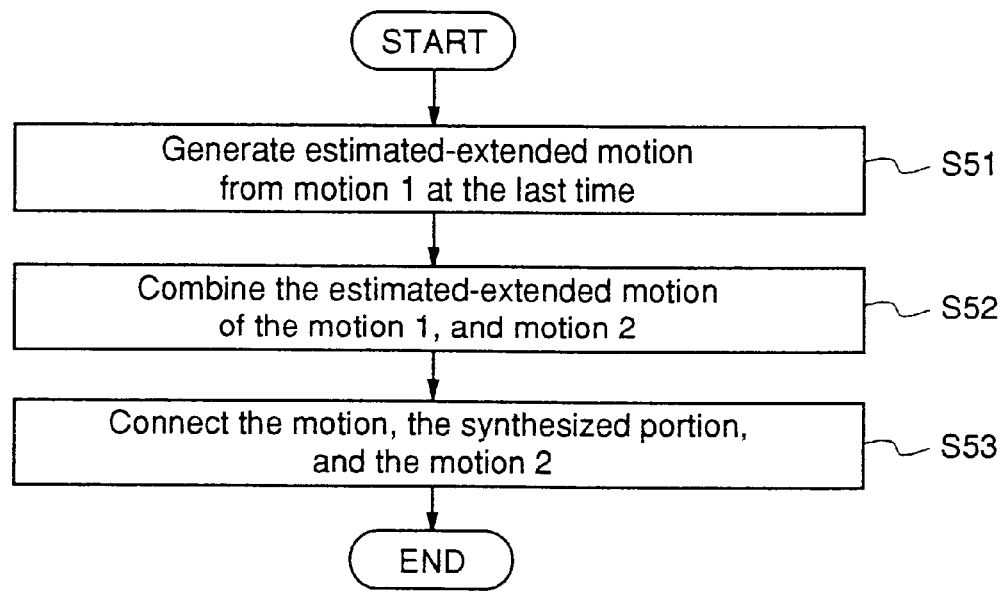
FIG. 9 is a flowchart showing motion connection in the second embodiment of this invention.

As shown in FIGS. 8 and 9, in the first processing method, time-series motion data from the last time TT of the motion 1M1 to a connection time CT1 after is estimated to produce an estimated-extended motion EM1 (see step S51 in FIG. 9). This estimated-extended motion and the time-series motion data of the motion 2M2 from the initial time to a connection time CT2 after are subjected to processing similar to the generation of a synthesized motion by the first method of the open periodic motion generating unit 3 of the first embodiment, to generate a connecting motion CT1 (see step S52 in FIG. 9). The time-series motion data of the connecting motion and the motion 2M2 the connection time after the initial time are successively connected to the motion 1M1 to generate a series of connected motion.

Figure 23:
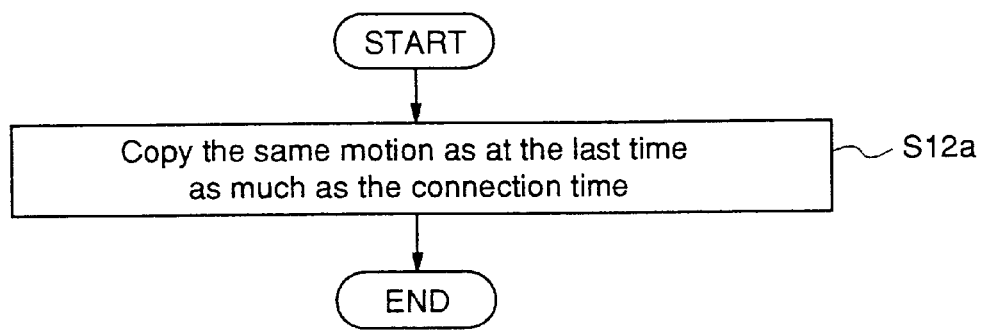
FIGS. 23(a) and 23(b) are flowcharts of the generation of an estimated-extended motion.
Figure 23:
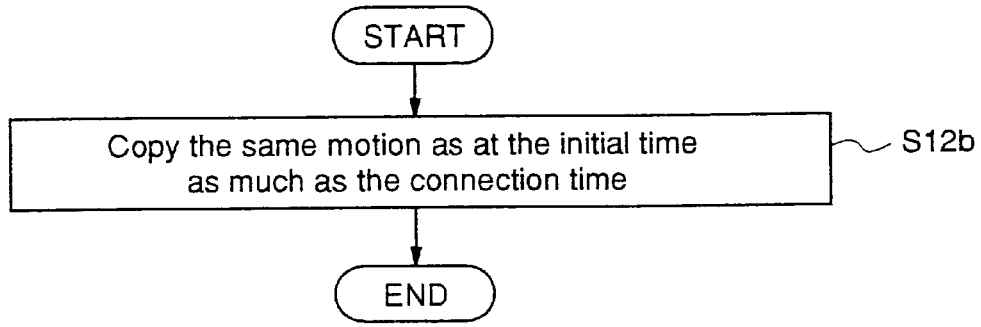

Next, three estimating methods of generating an estimated-extended motion will be explained. In a first estimating method, on the assumption that the object continues to be in a static state, as shown in FIG. 21(a) it is estimated that the same data as the motion data at the last time of front time-series motion data FTM continues only for the connection time CT. That is, the state of the motion at the last time is repeatedly copied as much as the connection time CT (see step S12 in FIG. 23(a)). Hence, high-speed processing is possible.

Figure 24:
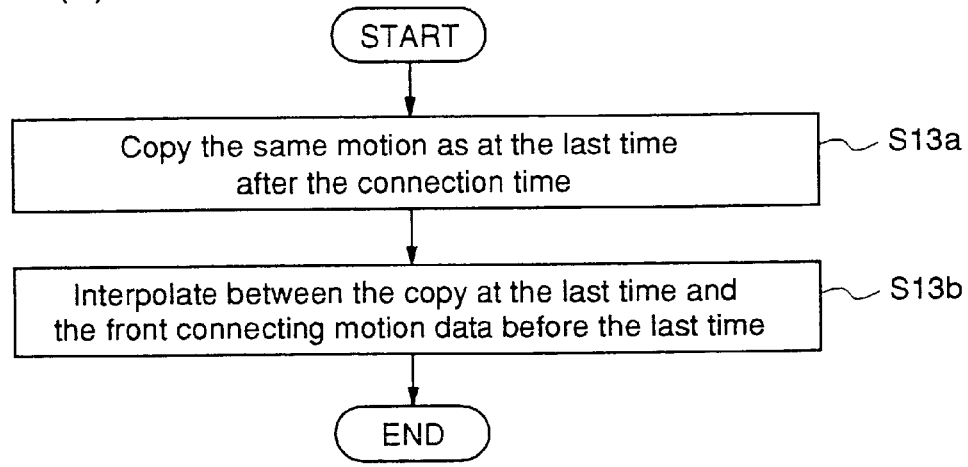
FIGS. 24(a), 24(b) are flowcharts of the generation of an estimated-extended motion.
Figure 24:
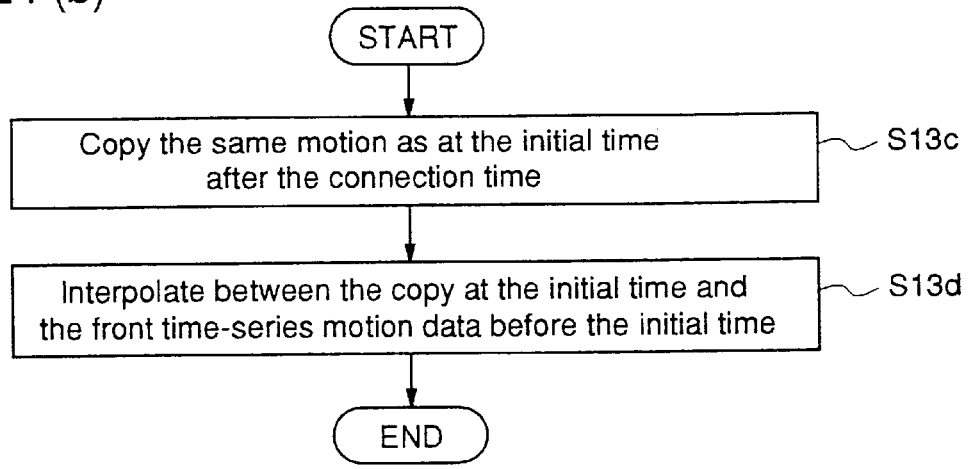

A second estimating method is based on the assumption that the object stops smoothly. As shown in FIG. 22(a), estimated-extended motion data EM is generated by estimating that the motion smoothly transfers the connection time CT after the last time to the same motion data as that of the front time-series motion data FTM at the last time. The state of the motion of the front time-series motion data at the last time is shifted by the connection time from the last time in terms of time (see step S13a in FIG. 24(a)). Thereafter, an estimated-extended motion EM is generated by interpolation using an interpolating function IC, such as a spline function, with the front time-series motion data before the last time (see step S13b in FIG. 24(a)).

Figure 26:
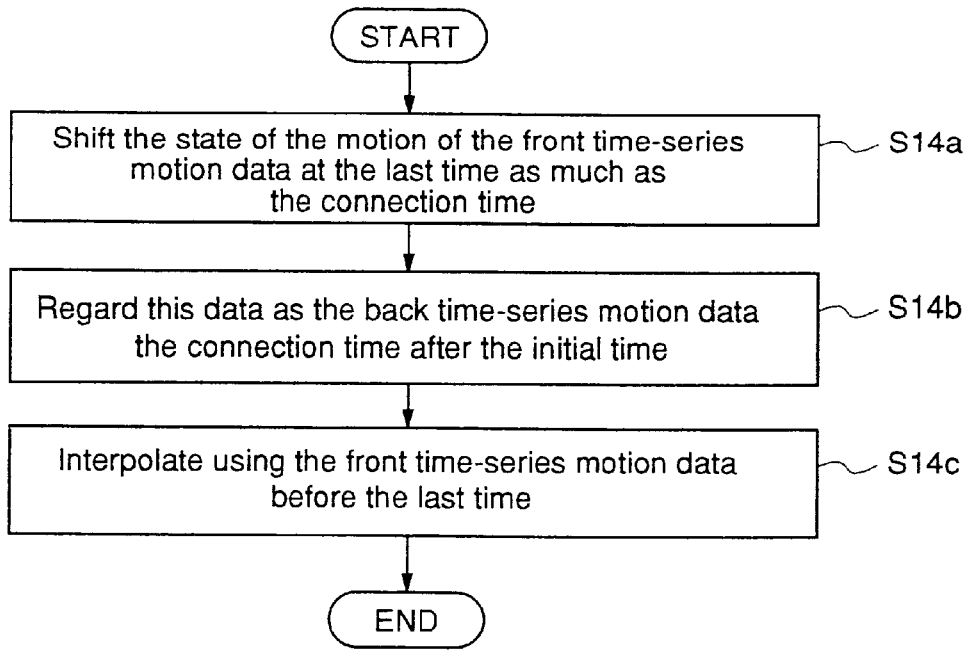
FIGS. 26(a) and 26(b) are flowcharts of the generation of an estimated-extended motion.
Figure 26:
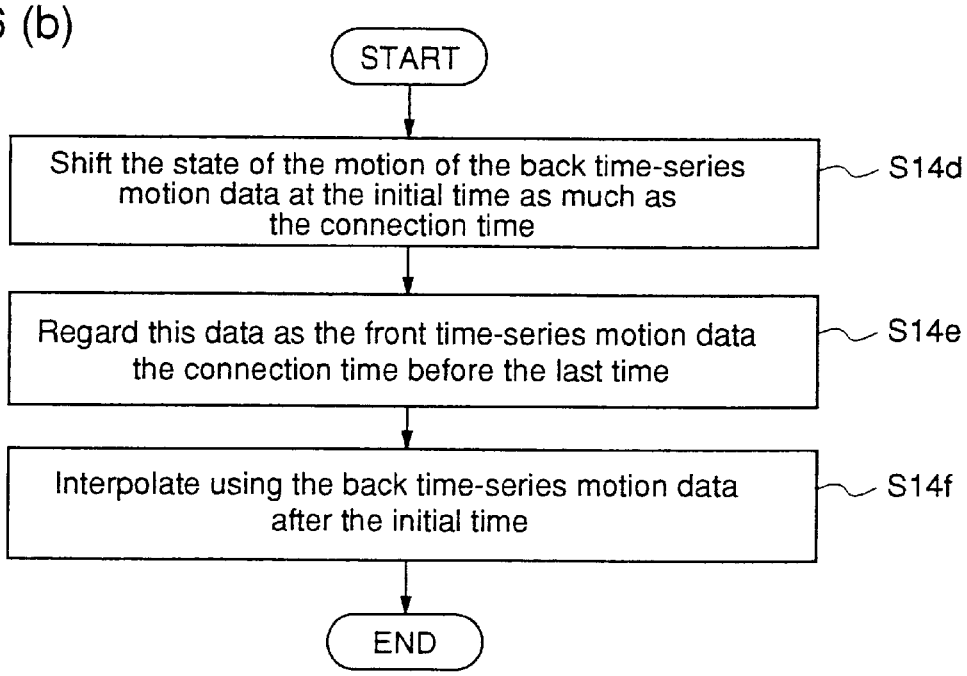

A third estimating method is based on the assumption that the estimated-extended motion approximates to the back time-series motion data. As shown in FIG. 25(a), the estimated-extended motion data EM is generated by estimating that the motion state of the front time-series motion data FTM at the last time is the same as that of the back time-series motion data from the initial time to the connection time CT after. The motion state of the front time-series motion data FTM from the last time to the connection time after (see step S14a in FIG. 26(a)) is regarded as the motion data of the back time-series motion data BTM from the initial time to the connection time CT (see step S14b in FIG. 26(b)). Thereafter, the estimated-extended motion is generated by interpolation using an interpolating function IC, such as a spline function, with the front time-series motion data before the last time (see step S14c in FIG. 26(a)).

Figure 11:
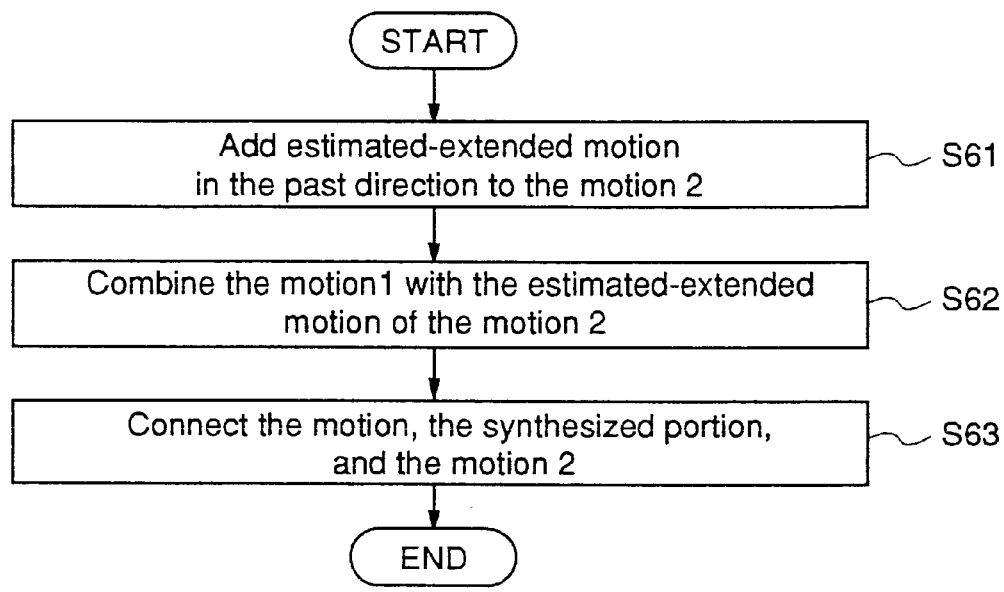
FIG. 11 is a flowchart showing motion connection in the second embodiment of this invention.

The second processing method by the motion connecting unit 13 will be explained. As shown in FIGS. 10 and 11, the estimated-extended motion EM is generated by estimating the time-series motion data in the past direction from the initial time of the motion 2M2 to the connection time before (see step S61 in FIG. 11).

The time-series motion data from the last time of the motion 1M1 to the connection time CT before, and the estimated-extended motion in the past direction form the initial time of the motion 2M2 to the connection time before, are combined in a way similar to the generation of a synthesized motion by the first method in the open periodic motion generating unit 3 of the first embodiment, to generate a connecting motion CM (see step S62 in FIG. 11). The time-series motion data of the connecting motion and the time-series motion data of the motion 2M2 are successively added to the motion 1M1 from the initial time until a period of (the last time)—(the connecting time), to generate a series of connected motions (see step S63 in FIG. 11).

Next, three estimating methods for generating on estimated-extended motion will be described. A first estimating method is based on the assumption that a motion is in a static state in past. As shown in FIG. 21(b), it is estimated that the same data as the motion data of the back time-series motion data BTM at the initial time continues in past as much as a given connection time. That is, the motion state at the initial time is repeatedly copied in past as much as a given connection time to generate an estimated-extended motion EM (see step 312b in FIG. 23(b)). Thus, high-speed processing is possible.

A second estimating method is based on the assumption that a motion smoothly starts from the standstill. As shown in FIG. 22(b), the same data as the back time-series motion data at the initial time is shifted from the initial time to the connection time CT before. It is estimated that a motion smoothly starts from the shifted state. An estimated-extended motion is generated by shifting the motion state of the back time-series motion data BTM at the initial time as much as the connection time CT in the past direction from the initial time in terms of time (see step S13c in FIG. 24(b)), and interpolating by an interpolating function IC, such as a spline function, with the back time-series motion data after the initial time (see step S13d in FIG. 24(b)).

A third estimating method is based on the assumption that an estimated-extended motion approximates to the front time-series motion data FTM. As shown in FIG. 25(b), the motion state of the back time-series motion data BTM a given connection time before the initial time is estimated to be the same as the motion state of the front time-series motion data FTM the connection time before the last time. That is, the estimated-extended motion is generated by regarding the motion state of the back time-series motion data BTM from the initial time to the connection time before as the front time-series motion data from the last time to the connection time before (see steps S14d and S14e in FIG. 26(b)), and interpolating by an interpolating function IC, such as a spline function, with the back time-series motion data after the initial time (see step S14f in FIG. 26(b).

Figure 13:
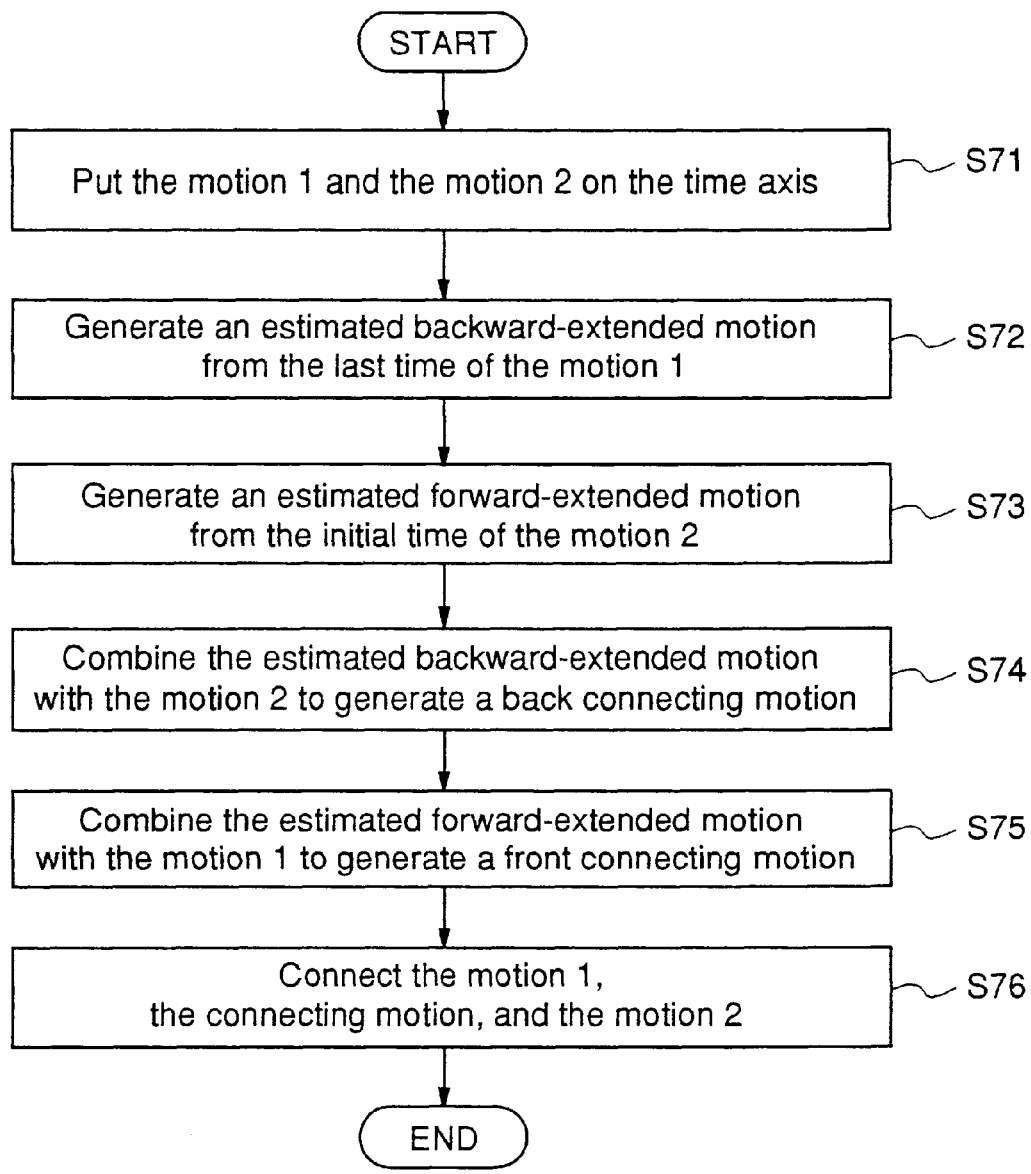
FIG. 13 is a flowchart showing motion connection in the second embodiment of this invention.

Third processing method by the motion connecting unit 13 will be explained. As shown in FIGS. 12 and 13, the motions 1M1 and 2M2 are disposed on the time axis in such a way as to match the time of the last time motion TT1 of the motion 1M1 to the time of the initial time motion 1T1 of the motion 2M2 (see step S71 in FIG. 13). Time-series motion data from the last time of the motion 1M1 to a period of γ×(the connection time) after is estimated to generate an estimated backward-extended motion (see step S72 in FIG. 13). Time-series motion data from the initial time of the motion 2m2 to a period of (1-γ)×(the connection time) before is estimated to generate an estimated forward-extended motion EMF1 (see step S73 in FIG. 13). Note that the range of γ is $0 \leq \gamma \leq 1$, called a connection time distribution rate.

Figure 28:
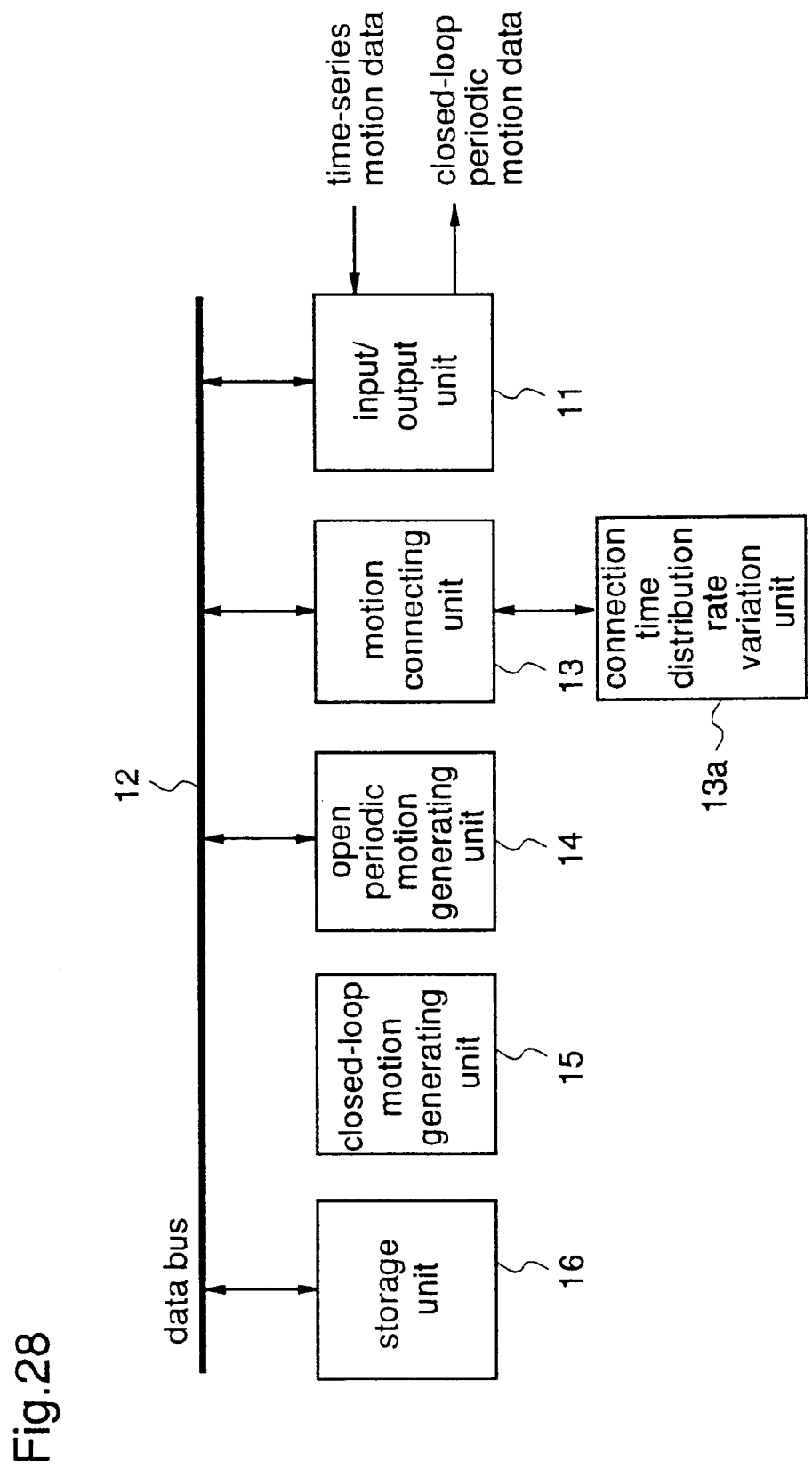
FIG. 28 is a diagram showing a functional configuration of the closed-loop periodic motion data generation apparatus according to the second embodiment, further including a synthesis time distribution rate variation unit.

As shown in FIG. 28, if the motion connecting unit 13 further includes a connection time distribution rate variation unit 13a, the user can vary the connection time distribution rate.

The time-series motion data from the last time of the motion 1M1 to (1-γ)×(the connection time) before and the time-series motion data of the estimated forward-extended motion generated by estimating from the motion 2M2 (see step S74 in FIG. 13), and the time-series motion data of the estimated backward-extended motion generated by estimating from the motion 1M1 and the time-series motion data from the initial time of the motion 2m2 to γ×(the connection time) after, are combined in a way similar to the generation of a synthesized motion by the first method in the open periodic motion generating unit 3 of the first embodiment (see steps S74 and S75 in FIG. 13), to generate a front connecting motion CMF1 and a back connecting motion CMB1, respectively. Note that the front and back connecting motions CMF1 and CMB1 are collectively called a connecting motion CM1.

As described above, the time-series motion data of the connecting motion and the time-series motion data of the motion 2M2 from γ×(the connection time) after the initial time to the last time, are successively added to the time-series motion data of the motion 1M1 from the initial time to the time of (the last time)–(1-γ)×(the connection time), to generate a series of connected motions (see steps S76 in FIG. 13).

Next, methods of generating an estimated backward-extended motion and an estimated forward-extended motion will be explained. The generation of the estimated backward-extended motion is carried out by the three estimating methods described in the first method in the motion connecting unit 13. On the other hand, the estimated forward-extended motion is generated by the three estimating methods described in the second method in the motion connecting unit 13. The three methods each for the estimated backward-extended motion and the estimated forward-extended motion are independent of each other, so the number of possible combinations of the generating methods is 9.

When the motions 1M1 and 2M2 are connected to each other, the starting motions are changed after the connection. As to time, the connection time distribution rate γ can control how long time the motion 1M1 or 2M2 is influenced by changes in the connecting motion. That is, the closer γ approaches to '0', the more changes in the connecting motion influence upon the motion 1M1, i.e., the less upon the motion 2M2. As opposed to this, the closer γ approaches to '1', the less changes in the connecting motion influence upon the motion 1M1, i.e., the more upon the motion 2M2. Particularly when γ=½, the motions are influenced equally in terms of time. The influence also depends on the estimating method. According to the result of experiments, among the three estimating methods described each for in the first and second processing methods in the motion connecting unit 13, the third estimating method has the least influence on either of the first and second methods. It may be attributed to the estimation in which either of estimated motions closes to the motion to be connected. However, the third estimating method needs a longer processing time than the first estimating method. Therefore, to control the influence of changes in the connecting motion, proposed are the following methods.

In a first method, there is a connection time distribution rate γ for each time-series motion data as additional information. The value may be shared in both cases of the generation of the estimated backward-extended motion and the generation of the estimated forward-extended motion, or the separate values may be held in both of the cases. A finer control is possible when the values are held separately. When two time-series motion data to be connected are front time-series motion data and back time-series motion data, the closer the connection time distribution rate approximates to '2', the more the front time-series motion data is affected, and the less the back time-series motion data is influenced, as described above. As opposed to this, the closer the connection time distribution rate approximates to '1', the less the front time-series motion data is affected. It is assumed that the rate γ (see FIG. 12) is calculated by γ=f(γ1, γ2). It is necessary for this function to satisfy the following conditions.

(1) if γ1=0 and γ2=0, γ=f(γ1, β2)=0
(2) If γ1=1 and β2=1, γ=f(γ1, γ2)=1
(3) If γ1=½ and γ2=½, γ=f(γ1, γ2)=½
(4) If γ1=0 and γ2=1, γ=f(γ1, γ2)=½
(5) If γ1=1 and γ2=0, γ=f(γ1, γ2)=½

As such a function, for example, if it is a linear function, there is γ=(γ1, γ2)=(γ1+γ2)/2. The estimated forward-extended motion and the estimated backward-extended motion are generated depending on the connection time distribution rate γ.

In a second method, numerals are assigned to methods of generating estimated-extended motions and the numerals are given to time-series motion data as additional information. The foregoing connection time distribution rates may be added as further additional information, or may be predetermined as a common value. Note that if the connection time distribution rate is added to the additional information, a finer control is possible.

For example, the first, second and third processing methods each for the generation of the estimated backward-extended motion and the generation of the estimated forward-extended motion are assigned '1', '2', and '3', respectively. Those numerals are given to each time-series motion data as additional information. The estimated backward-extended motion and the estimated forward-extended motion are generated according to the additional information.

In a third method, the importance (priority) of time-series motion data is given to the time-series motion data as additional information. It is assumed that it is better that the time-series motion data having the high importance is as least affected by connection as possible. For example, additional information for the front time-series motion data and the motion 1M1 has the importance δ1, and additional information for the back time-series motion data and the motion 2M2 has the importance δ2, where $0 \leq \delta 1, \delta 2 \leq 1$. The method of generating the estimated backward-extended motion is determined by the following rule.

(1) if $0 \leq \delta 2 \leq \frac{1}{3}$, te first estimating method
(2) if $\frac{1}{3} \leq \delta 2 \leq \frac{2}{3}$, the second estimating method
(3) if $\frac{2}{3} \leq \delta 2 \leq 1$, the third estimating method The method of generating the estimated forward-extended motion is determined by the following rule.

(1) if $0 \leq \delta1 \leq \frac{1}{3}$, the first estimating method
(2) if $\frac{1}{3} \leq \delta1 \leq \frac{2}{3}$, the second estimating method
(3) if $\frac{2}{3} \leq \delta1 \leq 1$, the third estimating method Next, the connection time distribution rate γ is determined by $\gamma=g(\delta1, \delta2)=(\delta1-\delta2+1)/2$. In the equation, 1−δ2 represents unimportance, and the larger this value is, the longer the effect time of connection may be. The equation is the function $\gamma=f(\gamma1, \gamma2)=(\gamma1+\gamma2)/2$ where γ1=δ1 and γ2=1−δ2. The equation has a very natural feature that if δ1=δ2, it is always γ=½. Note that this additional information representing the importance may be separately held for the estimated backward-extended motion and the estimated forward-extended motion to time-series motion data. This case makes possible a finer control.

All the above-described methods of connecting motions can be applied to the case of the foregoing synthesis time distribution rate.

Figure 31:
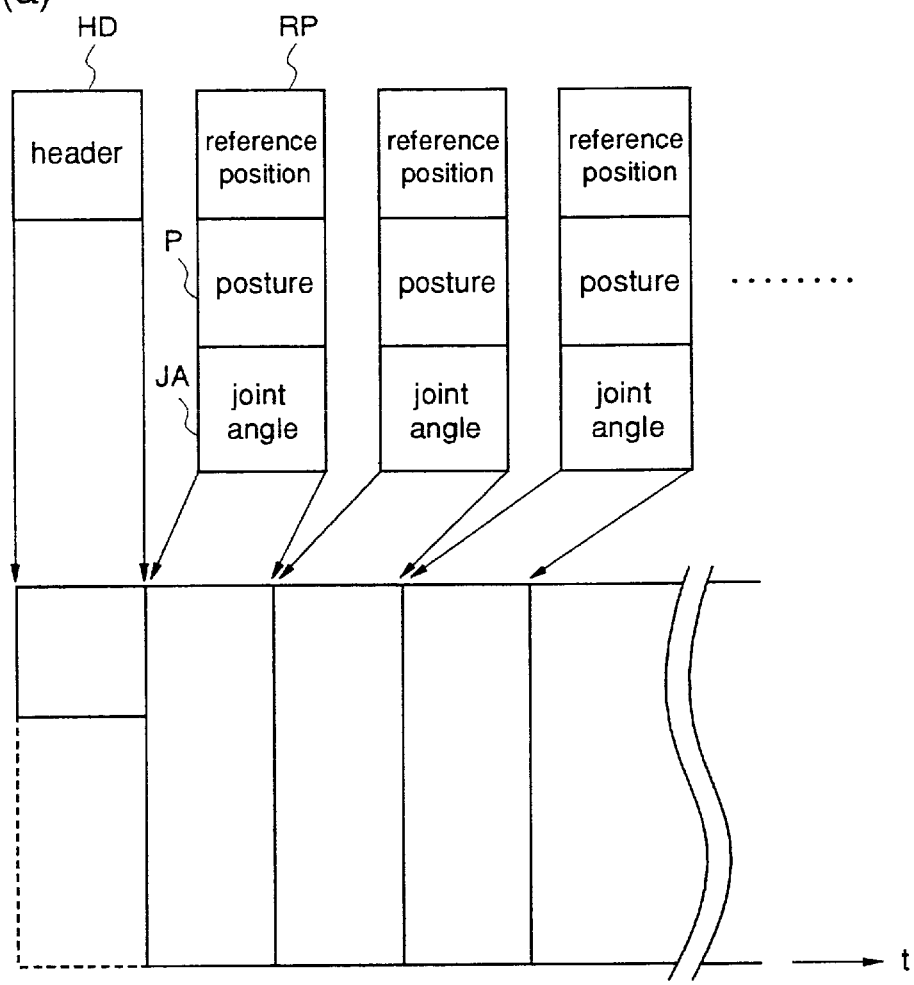
FIGS. 31(a) and 31(b) are diagrams showing data structures of data transmitted in this invention.
Figure 31:
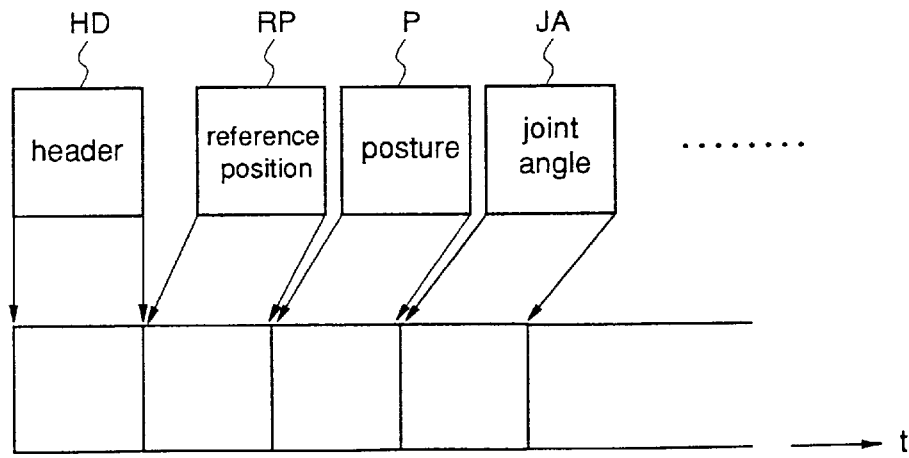

The connection time distribution rate γ and the importance δ, as shown in FIG. 31, are added to the header HD of time-series data, and transmitted outside. Note that this case has two formats shown in FIGS. 31(a) and 31(b). In FIG. 31(a), a reference position RP, a posture P, and a joint angle JA are transmitted together in the same time zone. In FIG. 31(b), a reference position RP, a posture P, and a joint angle JA are repeatedly transmitted in this order.

Time-series motion data of a series of motions generated by connecting plural motions is stored in the storage unit 16 via the data bus 12.

The open periodic motion generating unit 14 performs a process similar to that of the open periodic motion generating unit 3 of the first embodiment, to the time-series motion data of a series of motions generated by the motion connecting unit 13, stored in the storage unit 16, to generate an open periodic time-series motion (see step S13 in FIG. 5). The time-series motion data of the open periodic time-series motion generated is stored in the storage unit 16 via the data bus 12.

The closed-loop motion generating unit 15 reads out the position data of a whole object among the open periodic time-series motion data stored in the storage unit 16 via the data bus 12, and subjects the data to a process similar to that of the closed-loop motion generating unit 4 of the first embodiment, to make the data closed-loop (see step S14 in FIG. 5), The position data of a whole object among the open periodic time-series motion data stored in the storage unit 16 is replaced with the closed-loop position data of the whole object which is instead stored in the storage unit 16 (see step S15 in FIG. 5).

Thereafter, the contents of the storage unit 16 are output outside via the input/output unit 11 (see step S16 in FIG. 5).

As described above, in the closed-loop periodic motion data generation apparatus according to the second embodiment, the motion time at the head or tail of a first open non-periodic motion is extended by estimation, and this extended motion and the tail or head of a second open non-periodic motion are combined. The synthesized motion replaces with the head or tail of the second open non-periodic motion. Further, the motion time at the head or tail of the second open non-periodic motion is extended by estimation, and this extended motion and the tail or head of a third open non-periodic motion are combined. The synthesized motion replaces with the head or tail of the third open non-periodic motion. Therefore, an open periodic motion can be generated from plural open non-periodic motions without changing the time length of the plural motions.

Furthermore, the process of generating a synthesized motion and the process of generating a connecting motion in the second embodiment can be made common.

Further, in the second embodiment, if the open periodic motion generating unit 14 and the closed-loop motion generating unit 15 do not perform their processes, the apparatus can be used as a motion connecting apparatus. In this case, the apparatus can be realized by a computer program, and can be transmitted via a storage medium.

Further, the apparatus according to the second embodiment can be used as a motion connecting apparatus. The closed-loop periodic motion data generation and the motion connection is the basis of the technique which will be important in future in the production of games or graphical agents. So this invention has great importance.

EMBODIMENT 3

Figure 29:
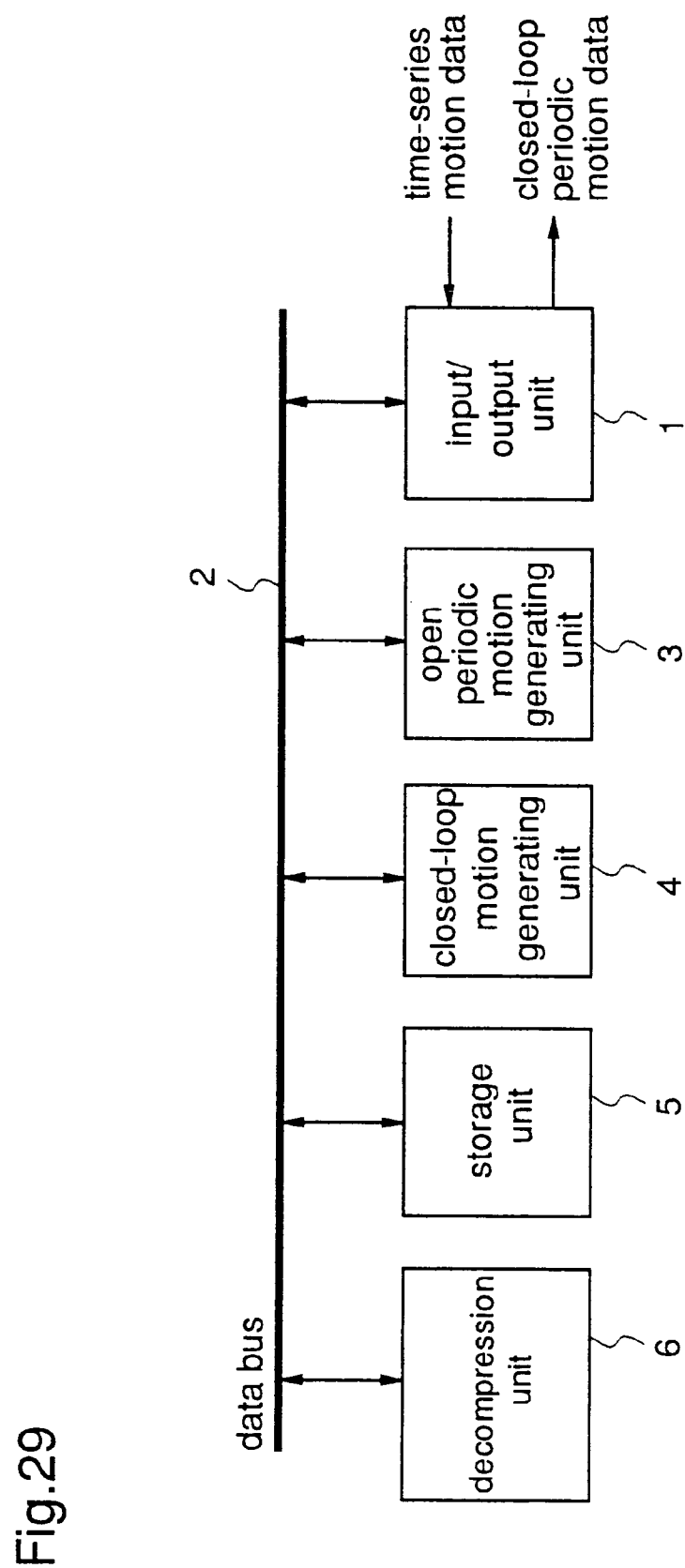
FIG. 29 is a diagram showing a functional configuration of a closed-loop periodic motion data generation apparatus in accordance with a third embodiment of the present invention.

Although in the first embodiment the time-series motion data input from the outside is original data itself, the data may be compressed at the receiver when the data is transmitted via a communications network, such as the Internet. In this case, a decompression unit 6 is set up, as an apparatus shows in FIG. 29. In the apparatus, time-series motion data compressed in advance by the transmitter, received by an input/output unit 1 is decompressed. From the decompressed data, an open periodic motion generating unit 3 generates an open periodic motion, as in the apparatus in FIG. 2. A closed-loop motion generating unit 4 receives the open periodic motion and generates a closed-loop motion. Thus, from compressed time-series motion data, an open periodic motion can be generated without changing the time-length of an open non-periodic motion.

EMBODIMENT 4

Figure 30:
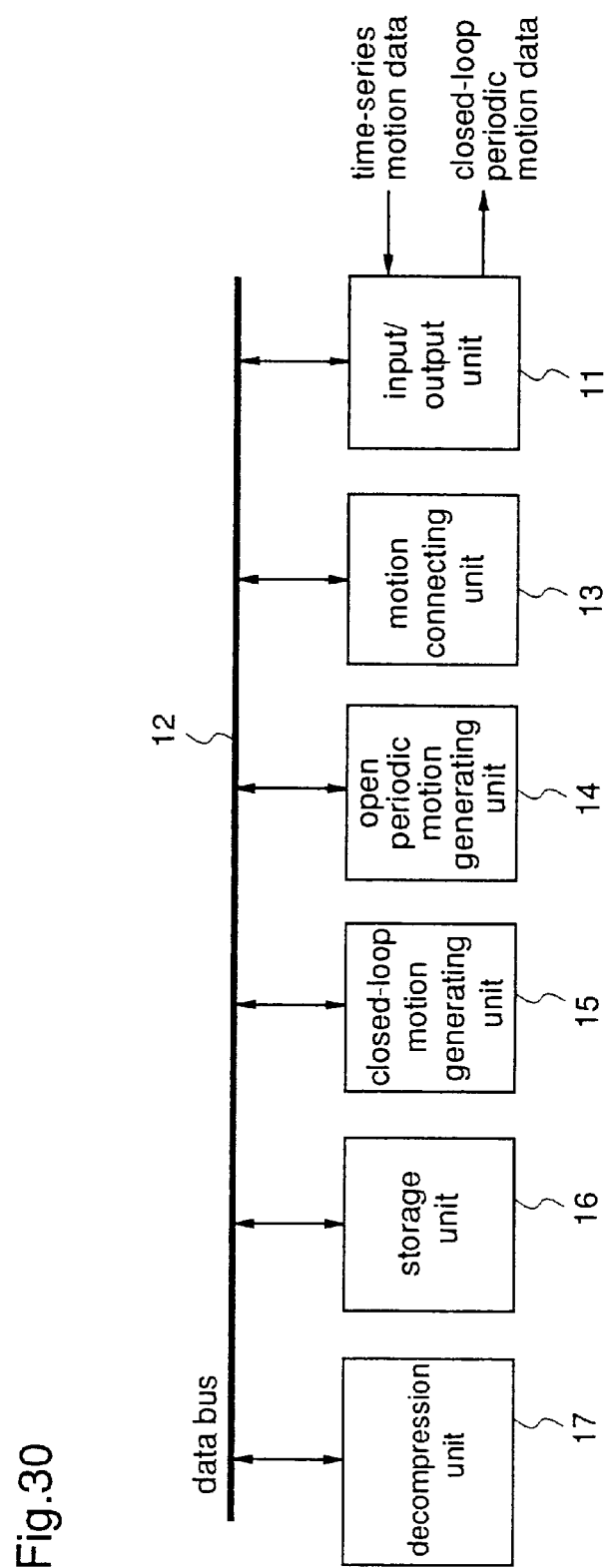
FIG. 30 is a diagram showing a functional configuration of a closed-loop periodic motion data generation apparatus in accordance with a fourth embodiment of the present invention.

Although in the second embodiment the time-series motion data input from the outside is original data itself, the data may be compressed at the receiver when the data is transmitted via a communications network, such as the Internet. In this case, a decompression unit 17 is set up, as an apparatus shows in FIG. 30. In the apparatus, time-series motion data compressed in advance by the transmitter, received by an input/output unit 11 is decompressed. As in the apparatus in FIG. 3, a motion connecting unit 13 connects plural time-series motion data. Thereafter, an open periodic motion generating unit 14 generates an open periodic motion. A closed-loop motion generating unit 15 receives the open periodic motion and generates a closed-loop motion. Thus, from compressed time-series motion data, an open periodic motion can be generated without changing the time-length of plural open non-periodic motions.

What is claimed is:

1. An apparatus for generating closed-loop periodic motion data, comprising:
   a storage unit;
   an input/output unit for (a) receiving time-series motion data including the position data of a whole multi-joint rigid body object at each time, and the posture angle data, joint slide vector data, and joint angle data of the multi-joint rigid body object at each time, (b) storing the received time-series motion data in said storage unit, and (c) reading out closed-loop periodic motion data generated from the time-series motion data, stored in said storage unit;
   an open periodic motion generating unit for (a) reading out time-series motion data stored in said storage unit, (b) generating open periodic time-series motion data by making the local parts of a multi-joint rigid body object periodic, and (c) storing the open periodic time-series motion data in said storage unit; and a closed-loop motion generating unit for (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

2. The apparatus of claim 1 wherein said apparatus further includes a motion connecting unit for (a) reading out plural time-series motion data stored said storage unit via said data bus, (b) connecting the plural time-series motion data to generate a series of time-series motion data, and (c) storing the series of time-series motion data in said storage unit via said data bus.

3. The apparatus claim 1 wherein said open periodic motion generating unit (a) estimates motion data as much as a synthesis time from the last time of time-series motion data to generate estimated-extended motion data, (b) combines the time-series motion data from the initial time to the synthesis time after and the estimated-extended motion data to generate synthesized motion data, (c) replaces the posture angle data, joint slide vector data, and joint angle data of the time-series motion data from the initial time to the synthesis time after with those of the synthesized motion data, and (d) calculates the amount of parallel translation for the position data of the whole multi-joint rigid body object, performs the parallel translation to the position data of the whole multi-joint rigid body object, and replaces the position data of the time-series motion data from the initial time to the synthesis time after with the resulting position data.

4. The apparatus claim 3, wherein said open periodic motion generating unit uses a function that (a) is 1 at the initial time of the synthesis time, and 0 at the last time of the synthesis time, (b) decreases monotonically, (c) is differentiable, and (d) is rotationally symmetrical by 180 degrees about the middle time of the synthesis time, within the synthesis time.

5. The apparatus of claim 3, wherein said open periodic motion generating unit uses a function that (a) is 0 at the initial time of the synthesis time, and 1 at the last time of the synthesis time, (b) increases monotonically, (c) is differentiable, and (d) is rotationally symmetrical by 180 degrees about the middle time of the synthesis time, within the synthesis time.

6. The apparatus claim 1 wherein said open periodic motion generating unit (a) estimates motion data as much as a synthesis time in the past direction from the initial time of time-series motion data, in terms of time, to generate estimated-extended motion data, (b) combines the time-series motion data from the last time to the synthesis time before and the estimated-extended motion data to generate synthesized motion data, (d) replaces the posture angle data, joint slide vector data, and joint angle data of the time-series motion data from the last time to the synthesis time before with those of the synthesized motion data, and (d) calculates the amount of parallel translation for the position data of the whole multi-joint rigid body object, performs the parallel translation to the position data of the whole multi-joint rigid body object, and replaces the position data of the time-series motion data from the last time to the synthesis time before with the resulting position data.

7. The apparatus claim 1 wherein said open periodic motion generating unit (a) estimates motion data as much as $\alpha \times$(a synthesis time) from the last time of time-series motion data, $\alpha$ being a synthesis time distribution rate ($0 \leq \alpha \leq 1$), to generate estimated backward-extended motion data, (b) estimates motion data as much as $(1-\alpha) \times$(the synthesis time) in the past direction from the initial time of time-series motion data, in terms of time, to generate estimated forward-extended motion data, (c) combines the time-series motion data from the initial time to $\alpha \times$(the synthesis time) after and the estimated backward-extended motion data to generate front synthesized motion data, (d) combines the time-series motion data from the last time to $(1-\alpha) \times$(the synthesis time) before and the estimated forward-extended motion data to generate back synthesized motion data, (e) replaces the posture angle data, joint slide vector data, and joint angle data of the time-series motion data from the last time to $\alpha \times$(the synthesis time) after with those of the front synthesized motion data, (f) calculates the amount of parallel translation for the position data of the whole multi-joint rigid body object from the last time to $\alpha \times$(the synthesis time) after, performs the parallel translation to the position data of the whole multi-joint rigid body object from the last time to $\alpha \times$(the synthesis time) after, and replaces the position data of the time-series motion data from the last time to $\alpha \times$(the synthesis time) after the resulting position data, (g) replaces the posture angle data, joint slide vector data, and joint angle data of the time-series motion data from the last time to $(1-\alpha) \times$(the synthesis time) before with those of the back synthesized motion data, and (h) calculates the amount of parallel translation for the position data of the whole multi-joint rigid body object from the last time to $(1-\alpha) \times$(the synthesis time) before, performs the parallel translation to the position data of the whole multi-joint rigid body object from the last time to $(1-\alpha) \times$(the synthesis time) before, and replaces the position data of the time-series motion data from the last time to $(1-\alpha) \times$(the synthesis time) before with the resulting position data.

8. The apparatus claim 1 wherein said closed-loop motion generating unit performs parallel translation, using a monotonically increasing function, to the position data of the whole multi-joint rigid body object from the last time to an effect time before, among the time-series motion data, in a way to match the position data of the whole multi-joint rigid body object at the last time to that at the initial time.

9. The apparatus claim 1 wherein said closed-loop motion generating unit performs parallel translation to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time.

10. The apparatus claim 1 wherein said closed-loop motion generating unit performs parallel translation to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time, and raising the result to the power of $\beta$ ($1 \leq \beta$).

11. The apparatus claim 1 wherein said input/output unit receives time-series motion data compressed in advance, and said apparatus further includes a decompression unit for decompressing the compressed time-series motion data, and storing the decompressed time-series motion data in said storage unit.

12. A method of generating closed-loop periodic motion data, comprising:

administrating inputs and outputs by (a) receiving time-series motion data including the position data of a whole multi-joint rigid body object at each time, and the posture angle data, joint slide vector data, and the joint angle data of the multi-joint rigid body object at each time, (b) storing the received time-series motion data in a storage unit, and (c) reading out closed-loop periodic motion data generated from the time-series motion data, stored in said storage unit;

generating an open periodic motion by (a) reading out time-series motion data stored in said storage unit, (b) generating open periodic time-series motion data by making the local parts of a multi-joint rigid body object periodic, and (c) storing the open periodic time-series motion data in said storage unit; and generating a closed-loop motion by (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

13. The method of claim 12 wherein said method further includes connecting motions by (a) reading out plural time-series motion data stored said storage unit via said data bus, (b) connecting the plural time-series motion data to generate a series of time-series motion data, and (c) storing the series of time-series motion data in said storage unit via said data bus.

14. The method of claim 12 wherein said generating an open periodic motion includes (a) estimating motion data as much as a synthesis time from the last time of time-series motion data to generate estimated-extended motion data, (b) combining the time-series motion data from the initial time to the synthesis time after and the estimated-extended motion data to generate synthesized motion data, (c) replacing the posture angle data, joint slide vector data, and joint angle data of the time-series motion data from the initial time to the synthesis time after with those of the synthesized motion data, and (d) calculating the amount of parallel translation for the position data of the whole multi-joint rigid body object, performing the parallel translation to the position data of the whole multi-joint rigid body object, and replacing the position data of the time-series motion data from the initial time to the synthesis time after with the resulting position data.

15. The method of claim 14 wherein in said generating an open periodic motion, used is a function that (a) is 1 at the initial time of the synthesis time, and 0 at the last time of the synthesis time, (b) decreases monotonically, (c) is differentiable, and (d) is rotationally symmetrical about the middle time of the synthesis time, within the synthesis time.

16. The method of claim 14 wherein in said generating an open periodic motion, used is a function that (a) is 0 at the initial time of the synthesis time, and 1 at the last time of the synthesis time, (b) increases monotonically, (c) is differentiable, and (d) is rotationally symmetrical about the middle time of the synthesis time, within the synthesis time.

17. The method of claim 12 wherein said generating an open periodic motion includes (a) estimating motion data as much as a synthesis time in the past direction from the initial time of time-series motion data, in terms of time, to generate estimated-extended motion data, (b) combining the time-series motion data from the last time to the synthesis time before and the estimated-extended motion data to generate synthesized motion data, (c) replacing the posture angle data, joint slide vector data, and joint angle data of the time-series motion data from the last time to the synthesis time before with those of the synthesized motion data, and (d) calculating the amount of parallel translation for the position data of the whole multi-joint rigid body object, performing the parallel translation to the position data of the whole multi-joint rigid body object, and replacing the position data of the time-series motion data from the last time to the synthesis time before with the resulting position data.

18. The method of claim 12 wherein said generating open periodic motion includes (a) estimating motion data as much as $\alpha \times$(a synthesis time) from the last time of time-series motion data, $\alpha$ being a synthesis time distribution rate ($0 \leq \alpha \leq 1$), to generate estimated backward-extended motion data, (b) estimating motion data as much as $(1-\alpha) \times$(the synthesis time) in the past direction from the initial time of time-series motion data, in terms of time, to generate estimated forward-extended motion data, (c) combining the time-series motion data from the initial time to $\alpha \times$(the synthesis time) after and the estimated backward-extended motion data to generate front synthesized motion data, (d) combining the time-series motion data from the last time to $(1-\alpha) \times$(the synthesis time) before and the estimated forward-extended motion data to generate back synthesized motion data, (e) replacing the posture angle data, joint slide vector data, and joint angle data of the time-series motion data from the last time to $\alpha \times$(the synthesis time) after with those of the front synthesized motion data, (f) calculating the amount of parallel translation for the position data of the whole multi-joint rigid body object from the last time to $\alpha \times$(the synthesis time) after, performing the parallel translation to the position data of the whole multi-joint rigid body object from the last time to $\alpha \times$(the synthesis time) after, and replacing the position data of the time-series motion data from the last time to $\alpha \times$(the synthesis time) after with the resulting position data, (g) replacing the posture angle data, joint slide vector data, and joint angle data of the time-series motion data from the last time $(1-\alpha) \times$(the synthesis time) before with those of the back synthesized motion data, and (h) calculating the amount of parallel translation for the position data of the whole multi-joint rigid body object from the last time to $(1-\alpha) \times$(the synthesis time) before, performing the parallel translation to the position data of the whole multi-joint rigid body object from the last time to $(1-\alpha) \times$(the synthesis time) before, and replacing the position data of the time-series motion data from the last time to $(1-\alpha) \times$(the synthesis time) before with the resulting position data.

19. The method of claim 12, wherein in said generating a closed-loop motion, parallel translation is performed, using a monotonically increasing function, to the position data of the whole multi-joint rigid body object from the last time to an effect time before, among the time-series motion data, in a way to match the position data of the whole multi-joint rigid body object at the last time to that at the initial time.

20. The method of claim 12 wherein in said generating a closed-loop motion, parallel translation is performed to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time.

21. The method of claim 12 wherein in said generating a closed-loop motion, parallel translation is performed to the position data of the whole multi-joint rigid body object from the last time to an effect time before, among the time-series motion data, by applying to the position data of the whole multi-joint rigid body object at a time t within the effect time, an amount of parallel translation obtained by multiplying the difference resulting from subtracting the position data of the whole multi-joint rigid body object at the initial time from that at the last time, with the difference between t and the initial time of the effect time, divided by the effect time, and raising the result to the power of $\beta$ ($1 \leq \beta$).

22. The method of claim 16 wherein said administrating inputs and outputs includes receiving time-series motion data compressed in advance, and said method further includes decompressing the compressed time-series motion data, and storing the decompressed time-series motion data in said storage unit.

23. A storage medium for storing a program for generating closed-loop periodic motion data, said program comprising:

administrating inputs and outputs by (a) receiving time-series motion data including the position data of a whole multi-joint rigid body object at each time, and the posture angle data, joint slide vector data, and the joint angle data of the multi-joint rigid body object at each time, (b) storing the received time-series motion data in a storage unit via a data bus, and (c) reading out closed-loop periodic motion data generated from the time-series motion data, stored in said storage unit via said data bus;

generating an open periodic motion by (a) reading out time-series motion data stored in said storage unit via said data bus, (b) generating open periodic time-series motion data by making the local parts of a multi-joint rigid body object periodic, and (c) storing the open periodic time-series motion data in said storage unit via said data bus; and generating a closed-loop motion generating by (a) reading out the position data of the whole multi-joint rigid body object among the open periodic time-series motion data, (b) generating closed-loop motion data by making the position data of the whole multi-joint rigid body object closed-loop, i.e., the movement of the whole multi-joint rigid body object being made closed-loop, (c) replacing the open periodic time-series motion data stored in said storage unit with the closed-loop motion data, and (d) storing the closed-loop motion data in said storage unit.

24. The storage motion of claim 23 wherein said program further includes connecting motions by (a) reading out plural time-series motion data stored said storage unit via said data bus, (b) connecting the plural time-series motion data to generate a series of time-series motion data, and (c) storing the series of time-series motion data in said storage unit via said data bus.

* * * * *

UNITED STATES PATENT AND TRADEMARK OFFICE
CERTIFICATE OF CORRECTION

PATENT NO. : 6,380,941 B2  Page 1 of 1
DATED : April 30, 2002
INVENTOR(S) : Mochizuki et al.

It is certified that error appears in the above-identified patent and that said Letters Patent is hereby corrected as shown below:

<u>Title page,</u>
Item [57], ABSTRACT,
Line 10, delete "closednb n-loop" and replace with -- closed-loop --

Signed and Sealed this

Eighteenth Day of June, 2002

Attest:

Attesting Officer

JAMES E. ROGAN
*Director of the United States Patent and Trademark Office*